(12) United States Patent
Modasiya et al.

(10) Patent No.: US 12,413,613 B2
(45) Date of Patent: Sep. 9, 2025

(54) SYSTEM AND METHOD OF DISCOVERING EXTERNAL ATTACK SURFACE BASED ON IDENTIFICATION DATA

(71) Applicant: Qualys, Inc., Foster City, CA (US)

(72) Inventors: Kunal Modasiya, Santa Clara, CA (US); Siddharth Bhatia, Santa Clara, CA (US); Milind Kapre, Pune (IN); Pablo M. Quiroga, Saint Helena, CA (US)

(73) Assignee: Qualys, Inc., Foster City, CA (US)

( * ) Notice: Subject to any disclaimer, the term of this patent is extended or adjusted under 35 U.S.C. 154(b) by 118 days.

(21) Appl. No.: 18/385,892

(22) Filed: Oct. 31, 2023

(65) Prior Publication Data

US 2025/0141907 A1    May 1, 2025

(51) Int. Cl.
*H04L 9/40* (2022.01)
*H04L 61/4511* (2022.01)

(52) U.S. Cl.
CPC ...... *H04L 63/1433* (2013.01); *H04L 61/4511* (2022.05); *H04L 63/107* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2021/0336991 A1* | 10/2021 | Couturier | H04L 63/20 |
| 2022/0329630 A1* | 10/2022 | Li | G06F 21/577 |
| 2023/0004445 A1* | 1/2023 | Bosch | G06F 9/541 |
| 2023/0283629 A1* | 9/2023 | Boyer | H04L 63/1416 |
| | | | 726/22 |
| 2023/0344848 A1* | 10/2023 | Huang | H04L 63/0263 |
| 2024/0236117 A1* | 7/2024 | McGrew | H04L 63/1441 |
| 2025/0063063 A1* | 2/2025 | Tishbi | G06F 16/9024 |

* cited by examiner

*Primary Examiner* — Michael Pyzocha
(74) *Attorney, Agent, or Firm* — Baker & McKenzie LLP

(57) ABSTRACT

Disclosed are systems and methods for discovering one or more computing assets associated with primary identification data. The systems and methods comprise a series of processes and steps to discover an organization's external attack surface. The processes and steps include building a unique external attack surface management catalog to be used as a configuration value as a first step of discovering unknown internet-facing assets of an organization. Then the processes and steps include using the unique external attack surface management catalog in combination with open-source reconnaissance and proprietary scanners to determine the external attack surface of the organization. The disclosed systems and methods then uniquely present the acquired relevant data to users using a single display screen. The disclosed systems and methods not only discover the external attack surface and internet-facing assets of an organization and its aliases, but also internet-facing assets of related subsidiary, affiliate, and partner entities.

20 Claims, 15 Drawing Sheets

SYSTEM AND METHOD OF DISCOVERING EXTERNAL ATTACK SURFACE BASED ON IDENTIFICATION DATA

TECHNICAL FIELD

The present disclosure relates to systems and methods for discovering computing assets to generate improved cybersecurity for organizations.

BACKGROUND

Cyber-attacks target computing networks through different forms and through different entry points. Hackers frequently use cyber-attacks to infiltrate and compromise computing networks. To protect against cyber-attacks, cybersecurity professionals should identify network assets, entry points, and vulnerabilities for computing networks to strategize and implement optimal network security measures. While no security measure detects every kind of cyber-attack or contains sufficient protection to protect against every detected cyber-attack, sometimes combining and layering a sufficient number and variety of defenses will deter an attacker. Combining and layering defenses may also limit the scope of harm from an attack.

However, assets, entry points, and vulnerabilities of a computing network are often numerous and some may be either forgotten, difficult to detect, or otherwise unknown to network managers and cybersecurity professionals. These unknown assets, entry points, and vulnerabilities tend to be unprotected and exploited by hackers. There exists a need for a system or method to assess computing networks and thoroughly detect all assets, entry points, and vulnerabilities of computing networks. In particular, there exists a need for a system or method to detect unknown and forgotten assets, entry points, and vulnerabilities in computing systems for network managers and cybersecurity professionals alike.

SUMMARY

The present disclosure is directed to systems and methods for discovering computing assets to generate improved cybersecurity for organizations. The systems and methods disclosed herein, for example, may include a method for discovering one or more computing assets associated with primary identification data, the method comprising receiving, using one or more computing device processors, primary identification data or domain data associated with the primary identification data. The systems and methods may further include determining, using the one or more computing device processors, whether the primary identification data, or the domain data associated with the primary identification data, is present in a first database. The systems and methods may also include, in response to determining the primary identification data or the domain data exists in the first database, retrieving, using the one or more computing device processors, secondary identification data associated with the primary identification data or the domain data associated with the primary identification data. The systems and methods may include querying, using the one or more computing device processors, a second database based on the primary identification data, the domain data associated with the primary identification data, or the secondary identification. The systems and methods may include obtaining, using the one or more computing device processors, based on the querying of the second database, one or more first domains. The systems and methods may include querying, using the one or more computing device processors, at least one of the second database or a third database, based on the one or more first domains. The systems and methods may include obtaining, using the one or more computing device processors, based on the querying the second database or the third database, one or more second domains. The systems and methods may include collating, using the one or more computing device processors, the one or more first domains and the one or more second domains. The systems and methods may include accessing, using the one or more computing device processors, a first domain name system (DNS) service. The systems and methods may include executing, using the one or more computing device processors, one or more DNS searches, using the first DNS service, using the one or more first domains and the one or more second domains. The systems and methods may include determining, using the one or more computing device processors, based on the executing the one or more DNS searches, one or more internet protocol (IP) addresses. The systems and methods may include assigning, using the one or more computing device processors, a first rating to the one or more IP addresses relative the primary identification data or the domain data associated with the primary identification data. The systems and methods may include scanning, using the one or more computing device processors, at least one of the one or more IP addresses, the one or more first domains, or the one or more second domains to determine one or more vulnerabilities or threats associated with the one or more IP addresses, the one or more first domains, or the one or more second domains, thereby resulting in first enriching information. The systems and methods may include querying, using the one or more computing device processors, one or more open-source tools, based on the one or more IP addresses, the one or more first domains, or the one or more second domains to determine one or more vulnerabilities or threats associated with the one or more IP addresses, the one or more first domains, or the one or more second domains, thereby resulting in second enriching information. The systems and methods may also include enriching, using the one or more computing device processors, the one or more IP addresses with the first enriching information and the second enriching information.

BRIEF DESCRIPTION OF THE DRAWINGS

The disclosure is illustrated by way of example and not by way of limitation in the figures of the accompanying drawings. Like reference numerals in the figures may be used to refer to similar elements. It is emphasized that various features may not be drawn to scale and the dimensions of various features may be arbitrarily increased or reduced for clarity of discussion. Further, some components may be omitted in certain figures for clarity of discussion. It is expressly understood that the description and drawings are only for the purpose of illustration and as an aid to understanding and are not intended as a definition of the limits of the invention.

DETAILED DESCRIPTION

Figure 1:
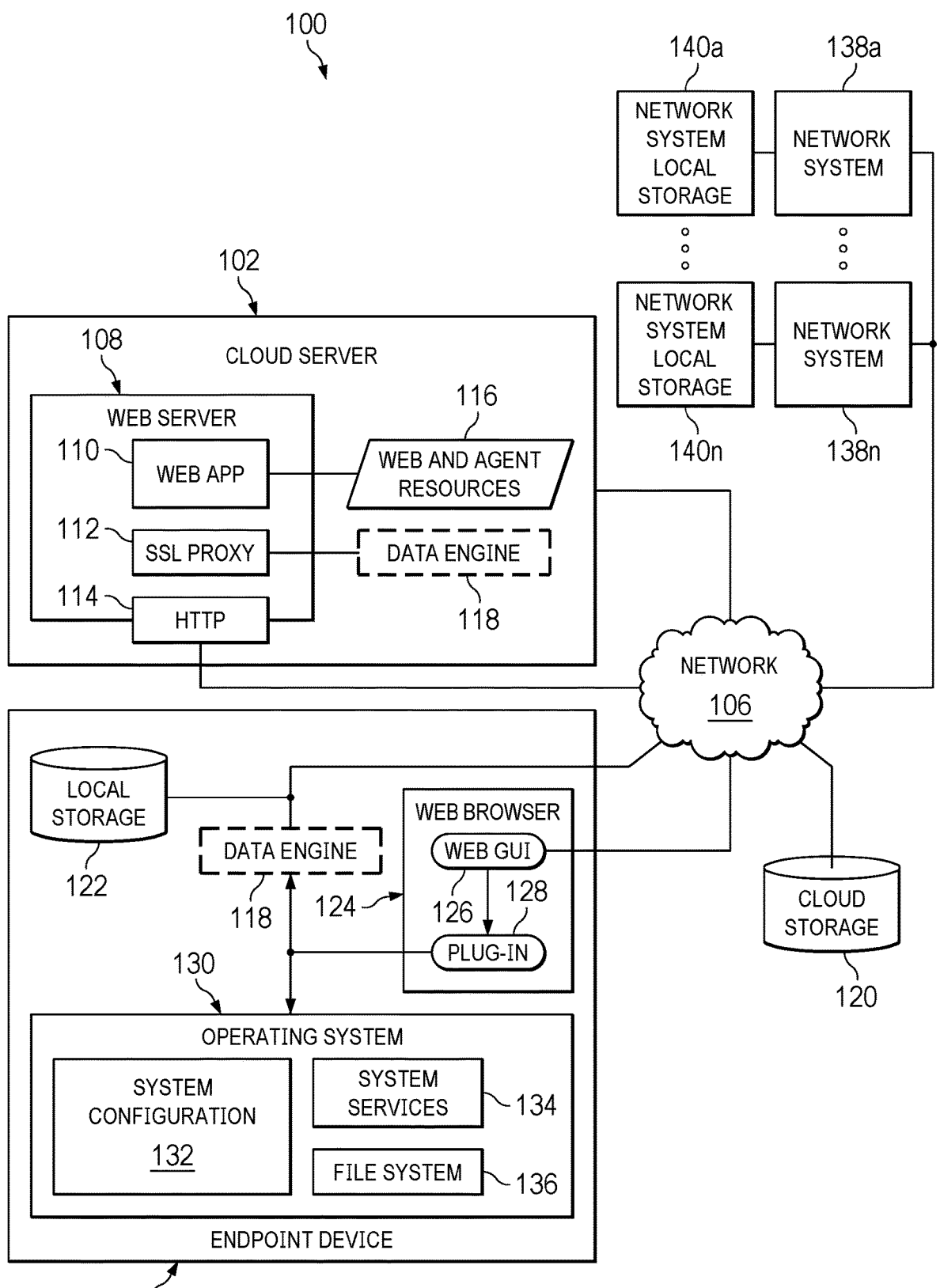
FIG. 1 is a high-level network and system diagram of a potential implementation of an external attack surface detection network, in accordance with some embodiments of this disclosure.

It is increasingly necessary to monitor an organization's external attack surface (EAS), also referred to as the digital footprint of the organization, to detect attack vectors that malicious hackers might exploit to infiltrate the organization's network system. Monitoring the external attack surface of any size organization may prove difficult given ever-changing assets included in an organization's network and assets that are unknown to organization managers and operators. There is therefore a need to leverage computational tools (e.g., asset databases with historic data, sentient hyper-optimized data access networks(s), domain name servers and lookups, etc.) to link together distinct and often fragmented data (e.g., hostnames, internet protocol (IP) addresses, or asset autonomous system numbers (ASNs)) associated to an organization and its related entities. Linking together data allows for easy collation, assessment, and other analyses of an organization's external attack surface for protection or modifying of asset data. In particular, there is a need to autonomously leverage, manipulate, and process the results of the aforementioned computational tools. The cost in terms of time, accuracy, and user experience (e.g., navigating multiple similar or dissimilar tools/interfaces, such as multiple data collection computing input tools) associated with data collection, analysis, transformation, modification, or output can affect productivity and/or workflow efficiency, computational or otherwise, within the organization.

At a high level, the disclosed systems and methods are for discovering one or more computational assets associated with primary identification data. The systems and methods comprise a series of processes and steps to discover an organization's external attack surface. The processes and steps include building a unique external attack surface management catalog to be used as a configuration value as a first step of discovering unknown internet-facing assets of an organization. Then the processes and steps include using the unique external attack surface management catalog in combination with open-source reconnaissance and proprietary scanners to determine the external attack surface of the organization. The disclosed systems and methods then uniquely present the acquired relevant data to users using a single display screen. The disclosed systems and methods not only discover the external attack surface and internet-facing assets of an organization and its aliases, but also discovers and detects internet-facing assets of related subsidiary, affiliate, and partner entities using a method of organization catalog curation and then enumerating all internet-facing assets for select organizations.

For example, a large organization may have multiple acquisitions every month and a complex corporate structure, with many subsidiaries and holding companies. For this example organization, discovering all internet-facing assets to determine the external attack surface is a complex, but not impossible task. With the disclosed external attack surface management methods and systems in combination with the disclosed catalog curation, the external attack surface of the example organization can be discovered without a user having to do any work.

Network Structure and Components

Illustrated in FIG. 1 is a high-level diagram of a potential system 100 providing one implementation of an external attack surface detection network. In the illustrated implementation, the system 100 may include a cloud server 102 communicatively coupled to a plurality of network systems 138*a* . . . 138*n* via a network 106. The system 100 may also include an endpoint device 104, which may be one or more computing devices such as mobile phones, laptop or desktop computers, smart or Internet of Things (IoT) devices, network-enabled devices such as smart or connected organizational assets or related devices such as those providing internet, voice, or emergency assistance, and cloud storage 120, which may include one or more databases, communicatively coupled via the network 106. While a single cloud server 102 and a single endpoint device 104 are illustrated, the disclosed principles and techniques could be expanded to include multiple cloud servers, multiple endpoints or computing devices, and multiple cloud storage devices, such as multiple databases.

In some embodiments, the cloud server 102 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, smart or Internet of Things (IoT) devices, network-enabled devices such as smart or connected organizational assets or related devices such as those providing internet, voice, or emergency assistance, and/or the like. The cloud server 102 may include a plurality of computing devices configured to communicate with one another and/or implement the techniques described herein.

In some embodiments, the endpoint device 104 may include or constitute a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, smart or Internet of Things (IoT) devices, network-enabled devices such as smart or connected organizational assets or related devices such as those providing internet, voice, or emergency assistance, and the like.

Figure 2:
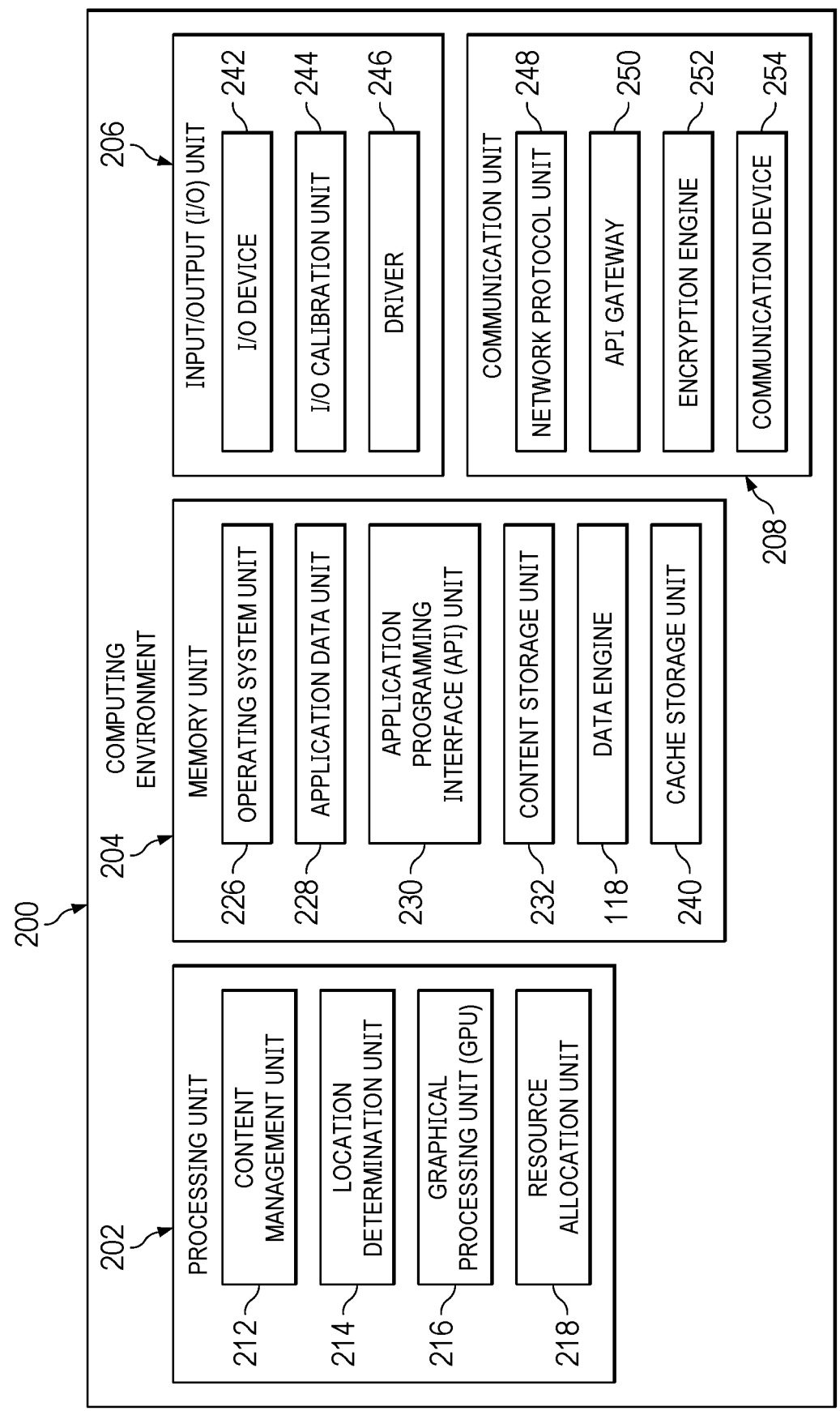
FIGS. 2 and 3 illustrate potential functional and system diagrams, respectively, of a computing environment for implementing an external attack surface detection network in accordance with some embodiments of this disclosure.
Figure 3:
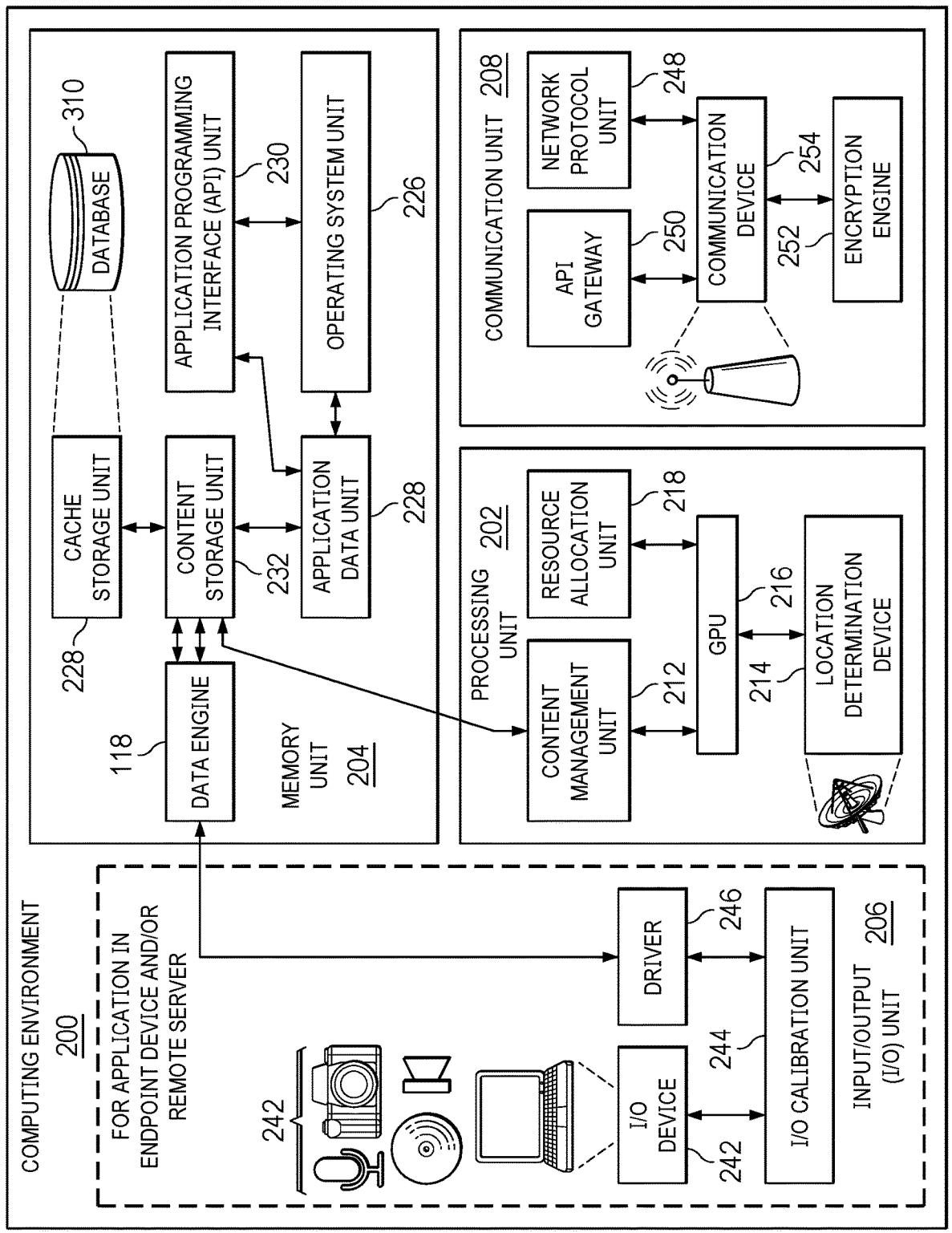

The cloud server 102 may include various elements of a computing environment as described in association with the computing environment 200 of FIGS. 2 and 3. For example, the cloud server 102 may include processing unit 202, a memory unit 204, an input/output (I/O) unit 206, and/or a communication unit 208 which are discussed in association with FIGS. 2 and 3. The cloud server 102 may further include subunits and/or other modules for performing operations associated with an external attack surface detection network such as registering a digital command or received data in an external attack surface detection network, generating dynamic context data or transformed or modified data associated with an organizational asset or received data in an external attack surface detection network, curating data, for example, by collating data, associated with an external attack surface detection network, and generating one or more digital records or data entries indicating computing operations and/or state data or other data within an external attack surface detection network. The cloud server may be locally or remotely operated as the case may require.

Turning back to FIG. 1, the cloud server 102 may include a web server 108, a data engine 118, and web and agent resources 116. The web server 108, the data engine 118 and the web and agent resources 116 may be coupled to each other and to the network 106 via one or more signal lines. The one or more signal lines may comprise wired and/or wireless connections.

The web server 108 may include a secure socket layer (SSL) proxy 112 for establishing HTTP-based connectivity 114 between the cloud server 102 and other devices or systems coupled to the network 106. Other forms of secure connection techniques, such as encryption, may be employed on the web server 108 and across other systems coupled to the network 106. Additionally, the web server 108 may deliver artifacts (e.g., binary code, instructions, data, etc.) to the data engine 118 either directly via the SSL proxy 112 and/or via the network 106. Additionally, the web and agent resources 116 of the cloud server 102 may be provided to the endpoint device 104 via the web app 110 on the web server 108. The web and agent resources 116 may be used to render a web-based graphical interface (GUI or data collection computing input tool) 126 via the web browser 124 running on the endpoint device 104.

The data engine 118 may either be implemented on the cloud server 102 and/or on the endpoint device 104. The data engine 118 may include one or more instructions or computer logic that are executed by the one or more processors such as the processors discussed in association with FIGS. 2 and 3. In particular, the data engine may facilitate executing the processing procedures, methods, techniques, and workflows provided in this disclosure. Some embodiments include an iterative refinement of one or more data models (e.g., a machine learning model, large language model, the generation and refinement or updating of probabilistic networks, and the like) associated with the external attack surface detection network disclosed via feedback loops executed by one or more computing device processors and/or through other control devices or mechanisms that make determinations regarding optimization of a given action, template, or model.

In some embodiments, the use of artificial intelligence and machine learning comprises an artificial intelligence engine or knowledge base that has an associated data model (e.g., a machine learning model) comprising a large language model and/or a data classifier, such as a probabilistic network, that can operate and/or is trained on textual data and/or image data and/or audio data and/or video data. For example, the textual data and/or image data and/or audio data and/or video data may be historic data or training data from one or more training data sets. For example, the large language model, according to some embodiments, comprises an artificial intelligence (AI) or a machine learning model configured to process or otherwise analyze vast amounts of character strings associated with spoken and/or written language. As another example, the data classifier comprises an AI or machine learning model generated by processing or otherwise analyzing historic data or training data from one or more training data sets for patterns by establishing a relationship between two or more data of such historic data or training data using a probabilistic network (e.g., a Bayesian network) or the like. The data classifier may further generate a knowledge base that is trained to recognize such patterns of processed or pre-processed historic or training data and generate one or more data groups associated with such patterns to enable the transformation or modification of data based on such patterns. In an embodiment, a pattern includes a relationship between data that allows for the prediction of a likely outcome if similar data were substituted into such relationship.

In some embodiments, the data engine 118 may access an operating system 130 of the endpoint device 104 in order to execute the disclosed techniques on the endpoint device 104. For instance, the data engine 118 may gain access into the operating system 130 including the system configuration module 132, the file system 136, and the system services module 134 in order to execute computing operations (e.g., machine learning or AI operations or other non-machine learning or AI operations) associated with an external attack surface detection network such as registering a digital command or selection in an external attack surface detection network, generating dynamic context data or organizational asset data or modified or transformed data associated with an organizational asset data object, computing object, or computing operation result in an external attack surface detection network, curating, modifying, transforming, and/or storing data associated with an external attack surface detection network, and generating or accessing one or more digital records or data indicating computing operations and/or state data or other data within an external attack surface detection network. A plug-in 128 of the web browser 124 may provide needed downloads that facilitate operations executed by the operating system 130, the data engine 118, and/or other applications running on the endpoint device 104.

The network 106 may include a plurality of networks. For instance, the network 106 may include any wired and/or wireless communication network that facilitates communication between the cloud server 102, the cloud storage 120, and the endpoint device 104. The network 106, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 138a . . . 138n may include one or more computing devices or servers, services, or applications the can be accessed by the cloud server 102 and/or the endpoint device 104 and or the cloud storage 120 via the network 106. In one embodiment, the network systems 138a . . . 138n may comprise one or more endpoint device(s) or computing devices 104 or local server(s) 102. In one embodiment, the network systems 138a . . . 138n comprises third-party applications or services that are native or non-native to either the cloud server 102 and/or the endpoint device 104. The third-party applications or services, for example, may facilitate executing one or more computing operations associated with resolving an event associated with organizational asset data. As further discussed below, the organizational asset data may comprise a document, selection, or file outlining one or more of: account data associated with an organization's asset portfolio or parametric data associated with detecting assets associated with an organization. According to some implementations, the applications or services associated with the network systems 138a . . . 138n and/or associated with the cloud server 102, and/or the endpoint device 104 must be registered to activate or otherwise enable their usage in the external attack surface detection network. In such cases, the applications and/or services may be encapsulated in a registration object such that the registration object is enabled or activated for use by the data engine 118 based on one or more of: context data or organizational asset data or modified or transformed data associated with a first user input, such as a seed value, or selection; device profile data associated with a first interface or data collection computing input tool through which the first user input was received; and user profile data associated with the user providing the first user input or selection. On the flip side, the applications and/or services may be encapsulated in a registration object such that the registration object is deactivated or blocked from usage by data engine 118. The first user input or selection may be textual or auditory and may comprise a natural language input, or it may be object selections of a computing object of an interface or data collection computing input tool.

The cloud storage 120 may comprise one or more storage devices that store data, information and instructions used by the cloud server 102 and/or the endpoint device 104 such as, for example, one or more databases. The stored information may include information about users, information about data models (e.g., machine or other learning model, an artificial intelligence model, etc.), information associated with historic user inputs and organizations, a user object characteristic, organizational asset data, information about analysis operations executed by the data engine 118, or the like. In one embodiment, the one or more storage devices mentioned above in association with the cloud storage 120 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or another mass storage device for storing information on a more permanent basis. While the cloud storage 120 is shown as being coupled to the cloud server 102 and the endpoint device 104 via the network 106, the data in the cloud storage 120 may be replicated, in some embodiments, on the cloud server 102 and/or the endpoint device 104. That is to say that a local copy of the data in the cloud storage 120 may be stored on the cloud server 102 and/or the endpoint device 104. This local copy may be synched with the cloud storage 120 so that when there are any changes to the information in the cloud storage 120, the local copy on either the cloud server 102 or the endpoint device 104 is also similarly updated or synched in real-time or in near-real-time to be consistent with the information in the cloud storage 120 and vice versa.

The endpoint device 104 may be a computing device, a smart phone, a tablet, a laptop computer, a desktop computer, a personal digital assistant (PDA), a smart device, a wearable device, a biometric device, a computer server, a virtual server, a virtual machine, a mobile device, an organizational asset, a data collection device, a smart or Internet of Things (IoT) device, network-enabled device such as a smart or connected organizational asset or related device such as those providing internet, voice, or emergency assistance, and/or a communication server. In some embodiments, the endpoint device 104 may include a plurality of computing devices configured to communicate with one another and/or implement the techniques described in this disclosure. It is appreciated that according to some implementations, the endpoint device may be used by a user to access the external attack surface detection network for sending and or receiving data and/or executing a plurality of operations associated with an organizational asset data object, computing object, or computing operation result. The data engine 118 may use the external attack surface detection network to communicate with the user transmitting and/or receiving data and to execute a plurality of analysis operations as further discussed below.

The local storage 122, shown in association with the endpoint device 104, may include one or more storage devices that store data, information, and instructions used by the endpoint device 104 and/or other devices coupled to the network 106. The stored information may include various logs/records or event files (e.g., exception event data associated with an organizational asset data object), security event data, image and/or video data, organizational asset data, modified or transformed data, enriched data, or any other data described herein. The one or more storage devices discussed above in association with the local storage 122 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The network system local storages 140a . . . 140n, shown in association with one or more network systems 138a . . . 138n, may include one or more storage devices that store data, information, and instructions used by the one or more network systems 138a . . . 138n and/or other devices coupled to the network 106. The stored information may include various logs/records or event files (e.g., event data associated with an organizational asset data object), security event data, image and/or video data, organizational asset data, modified or transformed data, enriched data, or any other data described herein. The one or more storage devices discussed above in association with the local storage 122 or network system local storages 140a . . . 140n can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 104 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 104 and/or one or more elements of the cloud server 102 shown in FIG. 1. The endpoint device 104 may also include subunits and/or other computing instances as provided in this disclosure for performing operations associated with organizational asset data object and/or the external attack surface detection network.

FIGS. 2 and 3 illustrate potential functional and system diagrams of a computing environment 200, according to some embodiments of this disclosure, an external attack surface detection network, registering a digital command in an external attack surface detection network, generating dynamic context data associated with an organizational asset data object in an external attack surface detection network, curating data associated with an external attack surface detection network such as image and/or video data, organizational asset data, modified or transformed data, enriched data, or any other data described herein, and generating one or more digital records indicating computing operations and state data within an external attack surface detection network. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 106. The computing environment 200 may be implemented on general-purpose hardware and/or specifically-purposed hardware as the case may be. Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the cloud server 102 and/or the endpoint device 104 and/or the network systems 138*a* . . . 138*n*.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor, such as a computing device processor or a computing system processor, may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, event content, content associated with an organizational asset data object, content associated with a registration object (e.g., a registration data object associated with registering a command or an application for use by the external attack surface detection network), media content, security event content, image and/or video data, organizational asset data, modified or transformed data, enriched data, or any other data described herein, or any combination thereof. In some instances, content on which the content management unit 212 may operate includes device information, user interface or data collected and/or stored by the data collection computing input tool, image data, text data, themes, audio data or audio files, video data or video files, documents, and/or the like. Additionally, the content management unit 212 may control the audio-visual environment and/or appearance of application data during execution of various processes (e.g., via web GUI 126 at the endpoint device 104). In some embodiments, the content management unit 212 may interface with a third-party content server (e.g., third-party content server associated with the network systems 138*a* . . . 138*n*), and/or specific memory locations for execution of its operations.

The location determination unit 214 may facilitate detection, generation, modification, analysis, transmission, and/or presentation of location information. Location information may include global positioning system (GPS) coordinates, an internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data described herein. In some embodiments, the GPU 216 may be utilized to render content for presentation on a computing device (e.g., via web GUI 126 at the endpoint device 104). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with an organizational asset data object or a registration object), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data, such as image and/or video data, organizational asset date, modified or transformed data, enriched data, or any other data described herein, during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

The memory unit 204 may include various types of data storage media such as solid state storage media, hard disk storage media, virtual storage media, and/or the like. The memory unit 204 may include dedicated hardware elements such as hard drives and/or servers, as well as software elements such as cloud-based storage drives. In some implementations, the memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of the memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local storage 122 of the endpoint device discussed with reference to FIG. 1. Additionally or alternatively, one or more secondary databases (e.g., the public record repository or cloud storage 120 discussed with reference to FIG. 1) or one or more tertiary databases (e.g., repositories within the network system local storages 140a . . . 140n discussed with reference to FIG. 1) located remotely from computing environment 200 may be used and/or accessed by the memory unit 204. In some embodiments, the memory unit 204 and/or its subunits may be local to the cloud server 102 and/or the endpoint device 104 and/or remotely located in relation to the cloud server 102 and/or the endpoint device 104.

Turning back to FIG. 2, the memory unit 204 may include subunits such as an operating system unit 226, an application data unit 228, an application programming interface (API) unit 230, a content storage unit 232, data engine 118, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a data engine discussed in association with FIG. 7.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. The operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and the like.

The application data unit 228 may facilitate deployment, storage, access, execution, and/or utilization of an application used by computing environment 200 and/or any other computing environment described herein. For example, the endpoint device 104 may be required to download, install, access, and/or otherwise use a software application (e.g., web application 165) to facilitate implementing an external attack surface detection network, registering a digital command in an external attack surface detection network, generating dynamic context data associated with an organizational asset data object in an external attack surface detection network, curating data associated with an external attack surface detection network, and generating one or more digital records indicating computing operations and state data within an external attack surface detection network. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud server 102 and the endpoint device 104 to communicate with each other. It is appreciated that the API unit 230 may facilitate accessing, using the data engine 118, one or more applications or services on the cloud server 102 and/or the network systems 138*a* . . . 138*n*.

The content storage unit 232 may facilitate deployment, storage, access, and/or utilization of information associated with performance of implementing operations associated with an external attack surface detection network and/or framework processes by computing environment 200 and/or any other computing environment described herein. In some embodiments, content storage unit 232 may communicate with content management unit 212 to receive and/or transmit content files (e.g., media content, organizational asset data object content, command content, input content, registration object content, etc.).

As previously discussed, the data engine 118 facilitates executing the processing procedures, methods, techniques, and workflows provided in this disclosure. In particular, the data engine 118 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 104. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, the I/O device 242 may include a variety of elements that enable a user to interface with computing environment 200. For example, the I/O device 242 may include a keyboard, a touchscreen, a button, a sensor, a biometric scanner, a laser, a microphone, a camera, and/or another element for receiving and/or collecting input from a user. Additionally and/or alternatively, the I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third party server systems, and/or the like (e.g., between the cloud server 102 and the endpoint device 104 and or the network systems 138*a* . . . 138*n*). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 104 may access the API unit 230 of the computing environment 200 via the API gateway 250. In some embodiments, the API gateway 250 may be required to validate user credentials associated with a user of the endpoint device 104 prior to providing access to the API unit 230 to a user. The API gateway 250 may include instructions for the computing environment 200 to communicate with another computing device and/or between elements of the computing environment 200.

System for Detecting Unknown Assets

In some embodiments, the disclosed systems and methods build a unique external attack surface management catalog to be used as a configuration value as the first step of discovering unknown internet-facing assets of an organization. In some embodiments, the disclosed systems and methods leverage open-source tools for the systematic collection of data for a given organization and its associated entities, subsidiaries, and affiliates, such as organization names, domain names, secure socket layer (SSL) certificate subjects used by the organizations, border gateway protocol (BGP) autonomous system numbers (ASNs), internet prefixes, and favicons (also known as website icons). The disclosed systems and methods may then curate this data by either or both an automated process and a group of human analysts to eliminate false positives. Furthermore, the disclosed catalog database enables a single user to maintain an edge by staying abreast of the organization's mergers and acquisitions, and the domains acquired through these mergers and acquisitions, in the world of digital sprawl, thus accurately discovering the previously unknown attack surfaces that spawn in a shadow information technology environment.

In some embodiments, the disclosed systems and methods first reference an external attack surface management catalog database with historic data to validate if an organization or domain configured by a user exists or not. If the organization or domain configured by the user does not exist, the disclosed system and methods may send feedback to the catalog where an additional catalog entry is automatically built in real time. If the organization or domain configured by the user does exist, data for all subsidiaries and acquired companies related to any or all of the inputs configured by the user are retrieved. The configured inputs may comprise organization name, domain, SSL certificate, border gateway protocol autonomous system numbers, and internet protocol netblocks. In some embodiments, a list of the autonomous system number blocks, favicons, domains and subdomains, and organizations are provided. In some embodiments, a first database is then queried to acquire all primary domains associated with all organization names and domains previously provided. The querying may occur by correlating the organization name and related email addresses. In some embodiments, the first database and a second database are queried to acquire all subdomains associated to all the primary domains found previously. In some embodiments, the first database may comprise a WHOIS database and the second database may comprise a Shodan database. In some embodiments, all the domains and subdomains identified and enumerated previously along with user provided domains and subdomains are collated. In some embodiments, a domain name system (DNS) lookup is then performed for all the above collated domains and subdomains. In some embodiments, the domain name system lookup may be performed using domain name system services such as Google DNS and Shodan DNS. Through this process, domains and subdomains are resolved into internet protocol (IP) addresses. In some embodiments, each domain or subdomain could result in multiple IP addresses based on a geographic location. In some embodiments, confidence scores are assigned to IP address findings. In some embodiments, the confidence score is an assigned relative qualification of the internet-facing asset and its relationship to the user's original input. In some embodiments, a set of confidence scores comprise high, medium and low, wherein high represents a better true positive.

In some embodiments, a high confidence score may result from a hostname or subdomain found on the first database from reverse enumeration and the same hostname or subdomain also found on the second database. In some embodiments, a high confidence score may result from performing a reverse IP lookup to obtain at least one domain and having the at least one domain be associated with at least one top level domain belonging to the relevant organization, according to either a generated catalog or prior domain numeration results. In some embodiments, a high confidence score may result from performing a reverse IP lookup to obtain a domain, not finding any associated domains or subdomains in the generated catalog or prior domain numeration, but instead matching the autonomous system number associated with the domain from the reverse IP lookup to an ASN associated with the relevant organization. In some embodiments, a medium confidence score may result from performing a reverse IP lookup to obtain a domain, not finding any associated domains or subdomains in the generated catalog or prior domain numeration, not finding a matching autonomous system numbers associated with the relevant organization, but instead, the organization name for any asset returned from the second database during the reverse IP lookup matches the organization listed in the catalogue or provided by the user, and the first database also lists an organization that matches the organization listed in the catalog or provided by the user when first querying the first database. In some embodiments, a low confidence score may result from performing a reverse IP lookup to obtain a domain, not finding any associated domains or subdomains that match those in the generated catalog or prior domain numeration, not finding a matching autonomous system number associated with the relevant organization, not returning an organization name that matches the organization listed for any of the queried assets from the second database, and not having an organization name returned that matches the organization listed in the catalog or the organization provided by the user when first querying the first database. In some embodiments, a high confidence score may result from having found an IP address but not an associated domain or subdomain, but the organization's associated email address found for the IP address in the first database matches the relevant organization's email address. In some embodiments, a high confidence score may result from having found an IP address but not an associated domain or subdomain and the organization's associated email found for the IP address in the first database does not match the relevant organization's email address, but the border gateway protocol autonomous system number associated with the IP address matches the border gateway protocol autonomous system number for the relevant organization in the catalog. In some embodiments, a low confidence score may result if an IP address is found, but an associated domain or subdomain are not found, the relevant organizations email address does not match the email address associated to the IP address as listed in the first database, and the border gateway protocol autonomous system numbers associated with the found IP address and the relevant organization, as listed in the catalog, do not match.

In some embodiments, the public IP addresses, domains, and subdomains are natively scanned to identify vulnerabilities, threats, SSL certificates, lifecycle of software, operating systems, open ports, services, and classifications of cloud hosting categories for those assets. In some embodiments, the results may include all or none of the aforementioned vulnerabilities, threats, SSL certificates, lifecycle of software, operating systems, open ports, services, and classifications of cloud hosting categories of those assets depending on the scan and access control on end hosts. In some embodiments, IP addresses and all subdomains found in the subsidiary enumeration are queried in open-source tools, including, but not limited to, Shodan, for vulnerabilities, threats, SSL certificates, lifecycle of software, operating systems, open ports, services, and classifications of cloud hosting categories for those assets. In some embodiments, primary domains and subdomains found in horizontal enumeration are queried in open-source tools, including, but not limited to, Shodan, for vulnerabilities, threats, SSL certificates, lifecycle of software, operating systems, open ports, services, and classifications of cloud hosting categories for those assets. In some embodiments, the final information received from the native scanning and open-source tools relating to the queried and scanned assets may be enriched for presentation. In some embodiments, the enriched data is uniquely presented to users using a single digital screen. The data may be presented to users of all levels within an organization. For example, the data may be presented to a junior analyst, or it may be presented to a chief information security officer.

In some embodiments, the network may comprise Java, Python, Jenkins, and React JavaScript coding languages, among others. In some embodiments, data structures such as Oracle database, Cassandra database, and Elastic Search, among others may be utilized as tools to construct or maintain the unique databases and data structures disclosed herein.

Figure 4:
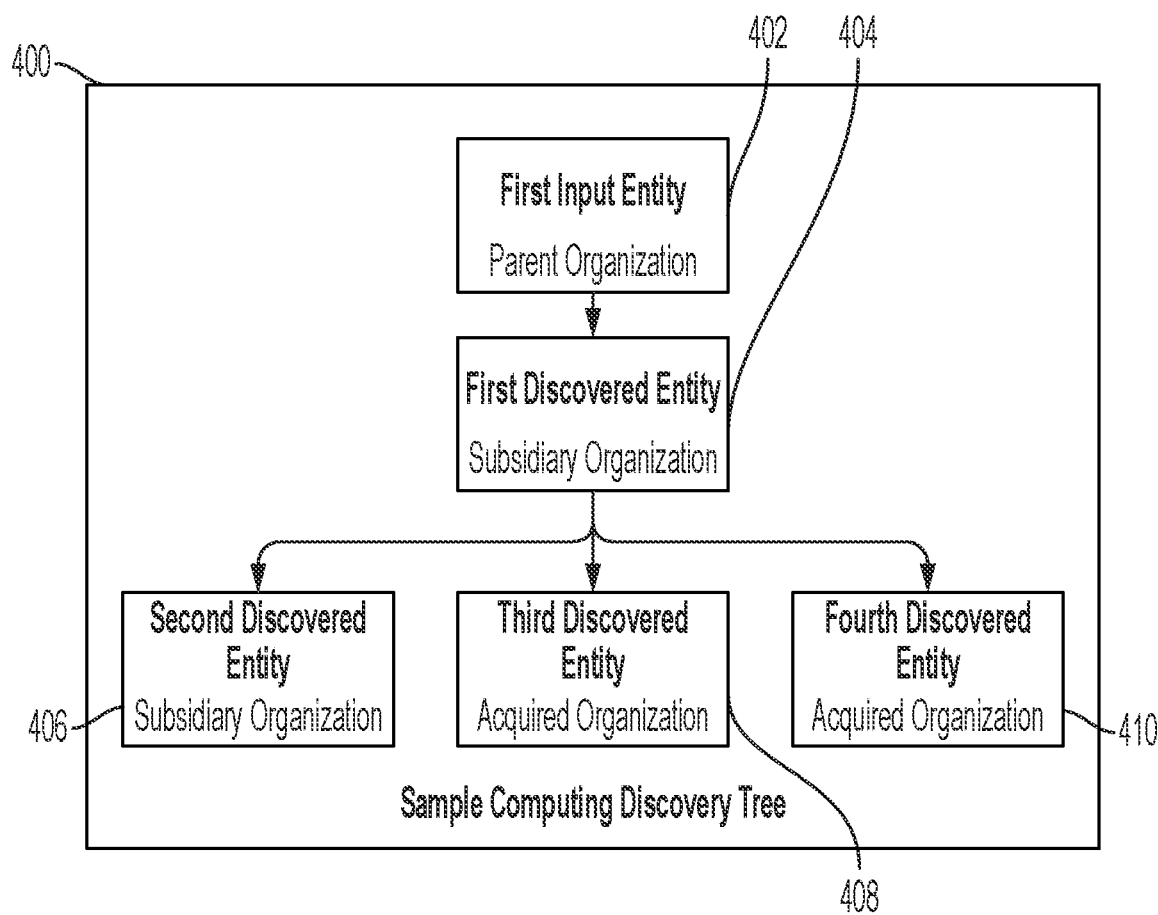
FIG. 4 shows a potential embodiment of a computing discovery tree, which displays a potential organization hierarchy that would be discovered using the systems and methods disclosed herein.

FIG. 4 shows a flow chart of a potential embodiment of a sample computing discovery tree 400, wherein the sample computing discovery tree 400 displays a potential first input entity 402, and potential associated entities that the methods and systems disclosed herein may detect. In this potential embodiment, a user or network system submits a first input entity 402. The external attack surface network would then perform computing processes to detect a first discovered entity 404, wherein the first discovered entity 404 is related to the first input entity 402. The external attack surface network would then process data relating to the first discovered entity 404 to detect a second discovered entity 406, a third discovered entity 408, and a fourth discovered entity 410, wherein the second discovered entity 406, third discovered entity 408, and fourth discovered entity 410 are associated with the first discovered entity 404. Although the first input entity 402, first discovered entity 404, second discovered entity 406, third discovered entity 408, and fourth discovered entity 410 in this embodiment are labelled as a parent organization, subsidiary organization, subsidiary organization, acquired organization, and acquired organization, respectively, any of the entities input, disclosed, or discovered may comprise any hierarchical status within an organization. For example, the first input entity may comprise an acquired organization, the first disclosed entity may comprise a parent organization, etc.

Figure 5:
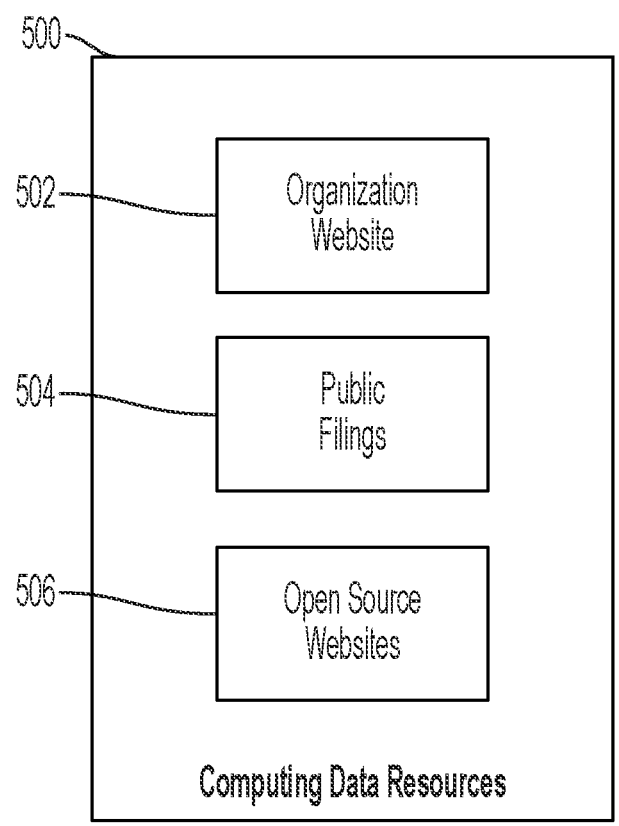
FIG. 5 shows potential computing data resources for collection and compilation of internet-facing assets within a computing network.

FIG. 5 shows a potential embodiment of computing data resources 500 utilized by the external attack surface network to detect and link organizational assets within an organization. In this potential embodiment, the computing data resources 500 may comprise an organization's website 502, public filings 504, and open source websites 506. These computing data resources are by no means exclusive and all-encompassing, as other resources, including but not limited to private databases and third-party network services, may also be referenced and utilized by the external attack surface network. In this potential embodiment, an organization website 502 may comprise an HTTP-based data source displaying organizational information. Public filings 504 may comprise governmental documents showing organizational acquisitions and official documents. Open-source websites 506 may comprise search results acquired on the internet, such as Google search results, or any other site publicly accessible over the internet. The computing data resources 500 in this potential embodiment may comprise one or more network systems 138a . . . 138n, a cloud server 102, a network 106, one or more endpoint devices 104, etc.

Figure 6:
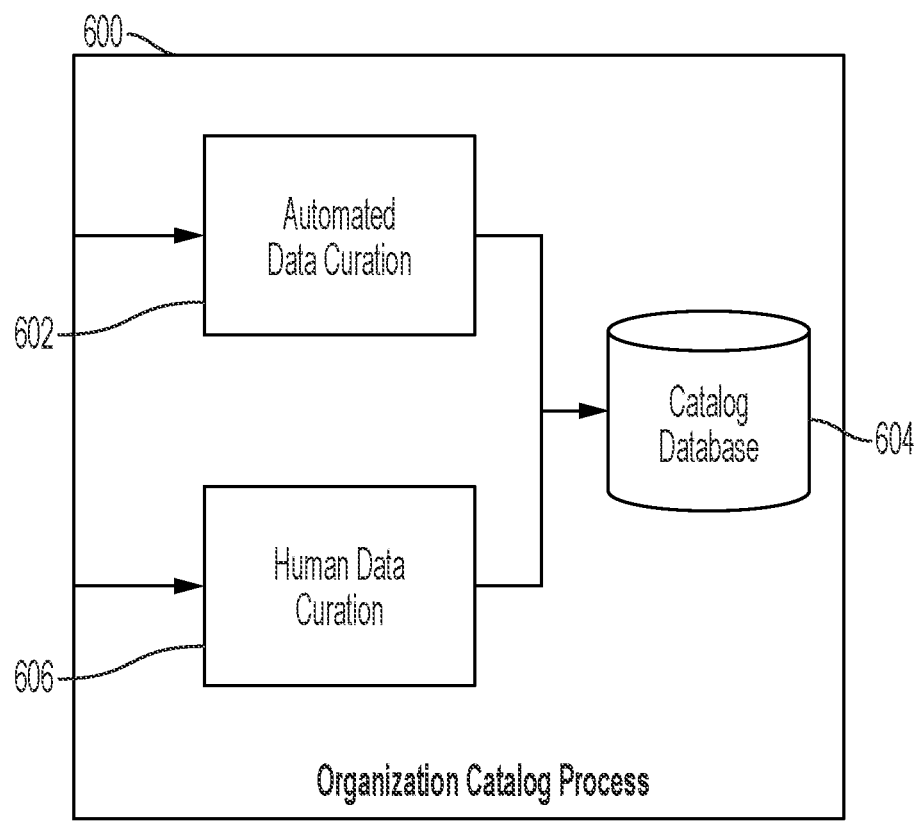
FIG. 6 shows a potential embodiment of an organization cataloging process, wherein the curation of a catalog database containing internet-facing assets comprises multiple forms of curation.

FIG. 6 shows a potential embodiment of an organization catalog process 600, wherein more than one curation process is involved to organize the data entries within a catalog database 604. In this potential embodiment, both automated data curation 602 and human data curation 606 are used to organize and select data entries within the catalog database 604. Automated data curation 602 may comprise using artificial intelligence, machine learning models, and/or pre-coded algorithms to curate data for the catalog database 604. Human data curation 606 may comprise using individuals or teams to scan and collate data for storing within the catalog database 604. The automated data curation 602 and human data curation 606 may occur within the network 106, including at the one or more network systems 138a . . . 138n, cloud server 102, endpoint device 104, etc.

Figure 7:
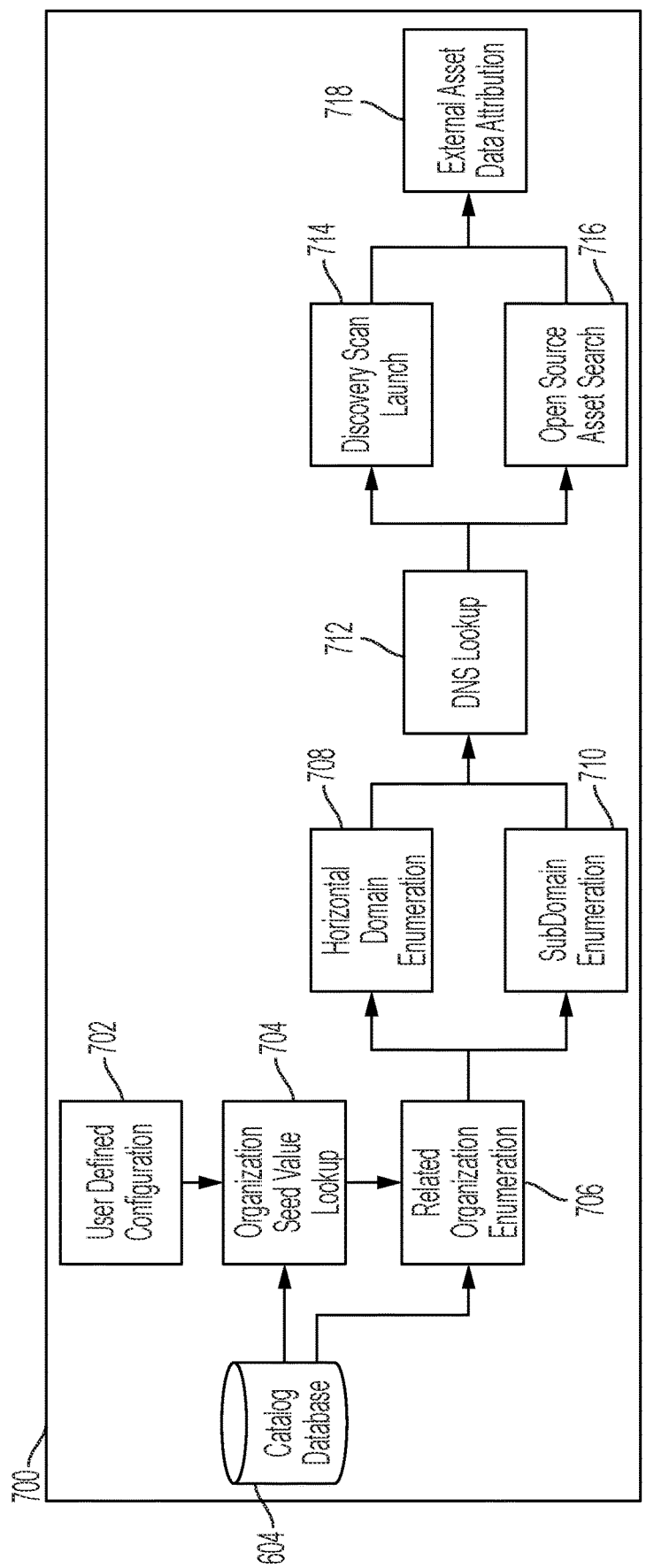
FIG. 7 shows a potential flowchart associated with an embodiment of the methods and systems disclosed herein, wherein the methods and systems disclosed herein detect internet-facing assets of an organization using a multi-server enumeration and scanning process.

FIG. 7 shows a flow chart of a potential embodiment of an external attack surface detection process 700 for unknown internet-facing assets of a corporation. The external attack surface detection process 700 may begin with a user defined configuration 702 of an organization or entity, herein referred to as a seed value, for which the user would like to detect all internet-facing assets and the external attack surface associated with the seed value as defined by the user. A seed value may also comprise any data relating to the organization or entity, such as domain data or IP address data. The external attack surface detection process 700 may then comprise of an organization seed value lookup 704 and related organization enumeration 706. The organization seed value lookup 704 may comprise accessing a catalog database 604 to identify any matching data entries to the seed value as defined by the user during the user defined configuration 702. The related organization enumeration 706 may comprise pulling, from the catalog database 604 data entries associated to or matched the user defined seed value. The data entries pulled may comprise the names of related organizations and entities, such as subsidiaries and acquired entities associated with the seed value, and associated primary domains, subdomains, IP addresses, SSL certificates, BGP ASNs, internet prefixes, favicons, ASN blocks, IP netblocks, and email addresses for the seed value or the related organizations and entities. Data entries may also include information such as associated cybersecurity vulnerabilities and threats, lifecycle of used software, used operating systems, open ports, services, and cloud hosting categories associated with the prior listed data entries. Using the data entries retrieved from the catalog database 604, the external attack surface detection process then commences horizontal domain enumeration 708 and subdomain enumeration 710. Horizontal domain enumeration 708 may comprise querying one or more network systems 138*a* . . . 138*n*, such as a domain name and IP lookup service provider, to detect related or associated primary domains related to the already identified data entries from the catalog database 604 and user defined configuration 702. Subdomain enumeration 710 may comprise querying one or more network systems 138*a* . . . 138*n*, such as a domain name and IP lookup service provider, to detect related or associated subdomains related to the already pulled data entries from the catalog database 604 and user defined configuration 702. Detected subdomains and primary domains from the horizontal domain enumeration 708 and subdomain enumeration 710 may be collated with previously identified data entries related to or associated with the seed value. The horizontal domain enumeration 708 and subdomain enumeration 710 may comprise additional queries to capture related or associated primary and subdomains to already detected primary domains and subdomains from prior iterations of horizontal domain enumeration 708 and subdomain enumeration 710. The external attack surface detection process 700 may then comprise a DNS lookup 712. The DNS lookup 712 may comprise sending all collated primary domains and subdomains to a DNS service to detect all IP addresses related to or associated with each collated primary domain and subdomain. The DNS service may comprise one or more network systems 138*a* . . . 138*n*, cloud server 102, endpoint device 104, etc. The newly detected IP addresses may be collated with the previously collated data entries. The external attack surface detection process 700 may then comprise a discovery scan launch 714 and an open-source asset search 716. The discovery scan launch 714 may comprise natively scanning already collated public IP addresses, primary domains, and subdomains within the catalog database 604 for cybersecurity vulnerabilities and threats, lifecycle of used software, used operating systems, open ports, services, and cloud hosting categories associated with the prior compiled and/or collated data entries. The open-source asset launch 716 may comprise querying open-source tools, such as DNS lookup services, for cybersecurity vulnerabilities and threats, lifecycle of used software, used operating systems, open ports, services, and cloud hosting categories associated with the prior listed data entries. The external attack surface detection process 700 may then comprise an external asset data attribution 718, wherein the external asset data attribution 718 may comprise enriching all compiled and collated data related to or associated with the used defined seed value and presenting the data in an easy to understand manner for a user.

Figure 8:
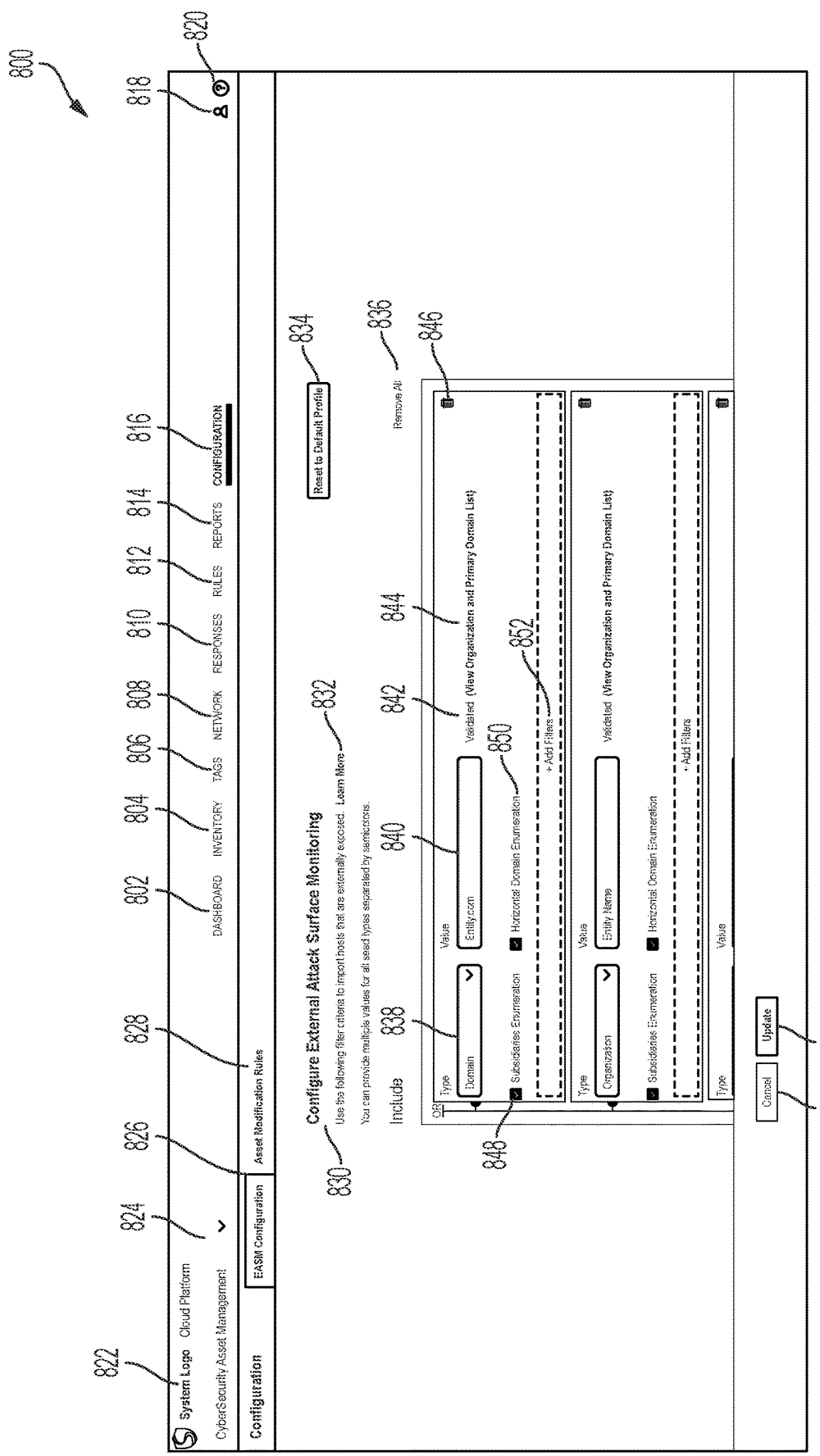
FIG. 8 shows a potential embodiment of a user interface or data collection computing input tool associated with receiving data from a user according to some embodiments of this disclosure.

FIG. 8 shows a potential embodiment of an external attack surface monitoring configuration screen 800 within the external attack surface network, wherein a user may input a seed value and other parameters. The external attack surface monitoring screen may include digital selectable objects to redirect the user to other display screens on the user interface. For example, the selectable objects may redirect users to a dashboard 802, inventory 804, tags 806, network 808, responses 810, rules 812, or reports 814 screen. A configuration selectable object 816 redirecting the user to the external attack surface monitoring configuration screen 800 may also appear. A user may also interact with selectable objects redirecting the user to user settings 818 or a help screen 820. The external attack surface monitoring configuration screen 800 may include a network system logo 822, a selectable object, such as a pulldown tab to select cybersecurity asset management 824, selectable objects for sub-display screens such as an external attack surface management configuration sub-display 826 and asset modification rules sub-display 828. A sub-display screen may comprise a petitioned off section of a display screen for presenting information. Within the external attack surface management sub-display 826, the user may encounter a header 830, a selectable object linked to further information 832, a selectable object to reset configuration setting to defaults 834, a selectable object to remove all current inputs 836, a selectable object for a user to choose the type of seed value to input 838, a fill-in box to enter a seed value 840, a seed value status indicator 842, a selectable object redirecting the user to an organization and primary domain screen 844 related to the entered seed value, a selectable object to remove specific entered seed values 846, a selectable object to request enumeration of subsidiary information 848, a selectable object to request enumeration of horizontal domains 850, a selectable object to add data filters 852, and selectable object to cancel 854 and update 856 the external attack surface management configuration. Any mention of a selectable object within this disclosure may comprise a clickable hyperlink, button, or icon to redirect a user to another digital location or choose an option. All forms of selectable objects are used as examples and may be interchanged with other forms of selectable objects, including selectable objects not explicitly listed in this disclosure.

Figure 9:
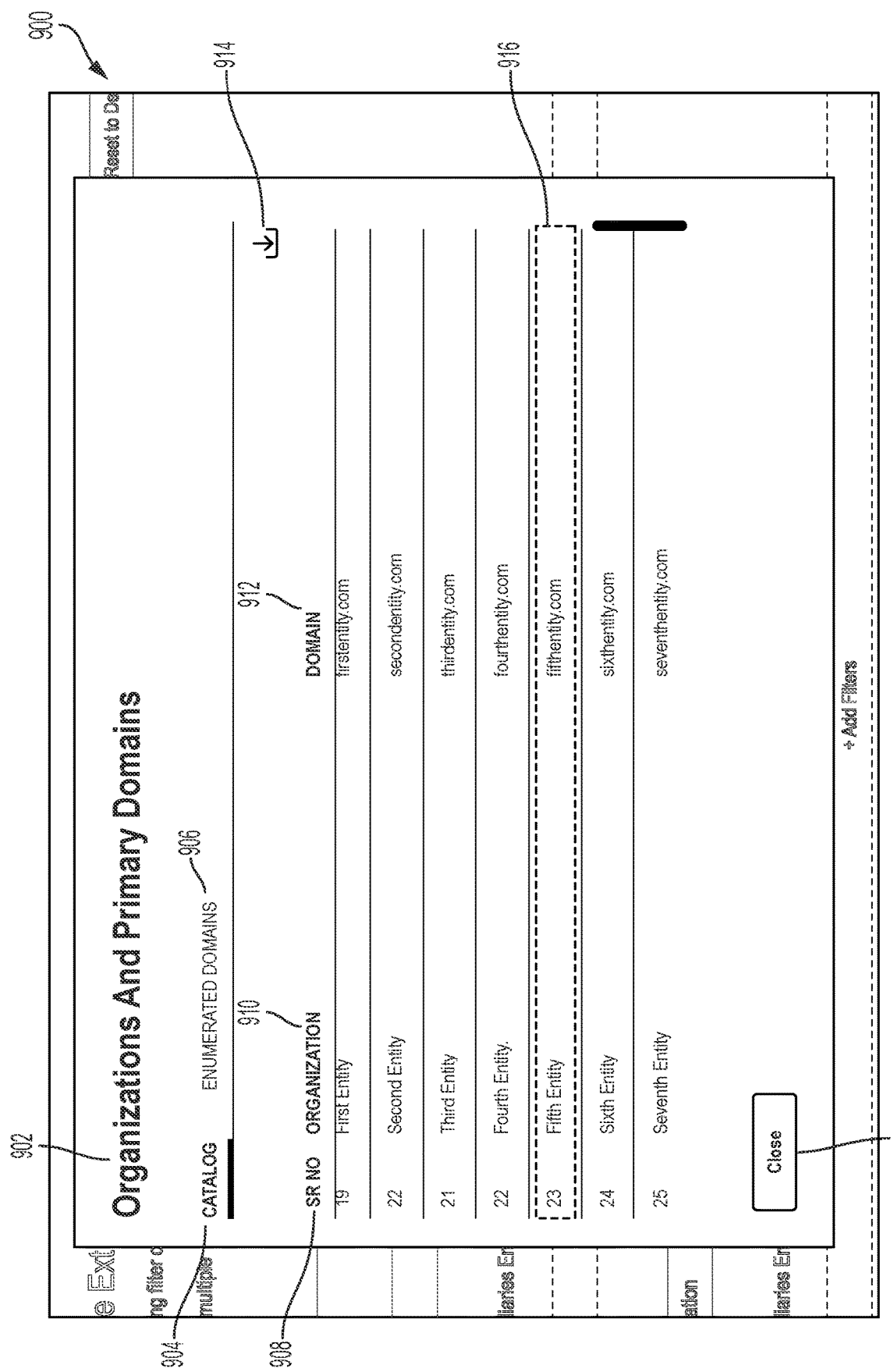
FIG. 9 shows a potential embodiment of a user interface associated with a display of organizations and primary domains related to a user's input and configuration.

FIG. 9 shows a potential embodiment of the redirected organization and primary domain screen 900 related to the organization and primary domain screen selectable object 844. The redirected organization and primary domain screen may comprise a heading 902, a selectable object to display a catalog of organizations and domains 904, a selectable object to display enumerated domains 906, a list of serial numbers 908, a list of organization entities 910, a list of domains 912, a selectable object to download 914 the displayed data to an endpoint device 104 or local server, and a selectable object to close 918 the organization and primary domain screen. A user may select each enumerated entity and domain 916 for further information and manipulation of data.

Figure 10:
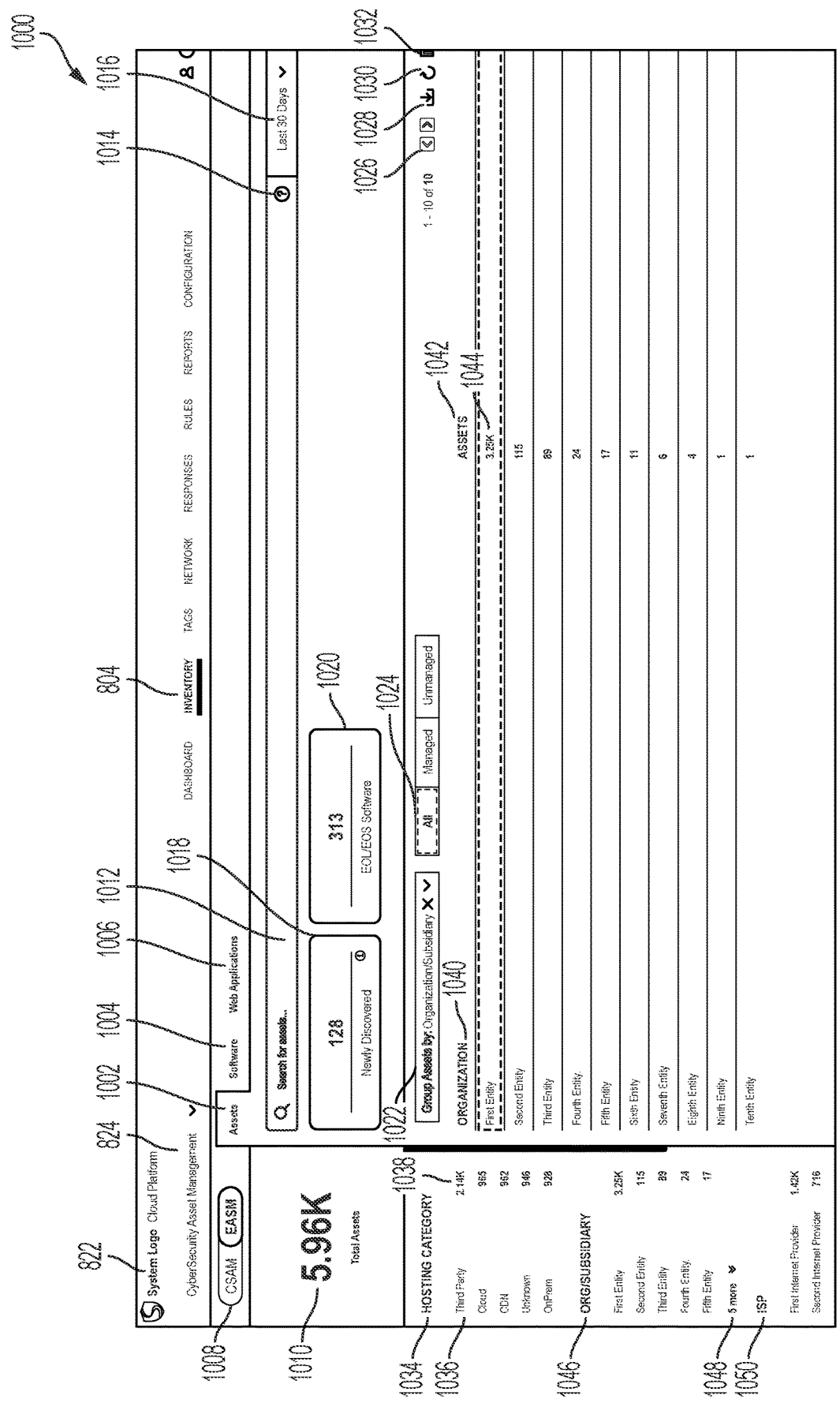
FIG. 10 shows a potential embodiment of a user interface associated with a display and sorting of assets for specific input parameters.

FIG. 10 shows a potential embodiment of an external attack surface management inventory screen 1000. The embodiment may include a network system logo 822, a selectable tab to view assets 1002, a selectable tab to view software 1004, a selectable tab to view web applications 1006, a selectable slider to switch between cybersecurity asset management (CSAM) and external attack surface management (EASM) 1008, a calculation of total assets 1010, a search bar for locating assets 1012, a selectable help icon 1014 for searching for assets, a selectable drop down menu 1016 to filter search results, an icon listing newly discovered assets 1018, an icon listing end of life (EOL) and end of service (EOS) software 1020, one or more icons indicating filter settings 1022, a selectable object to filter between managed assets and unmanaged assets 1024, selectable objects to change the display page to another set of assets 1026, a selectable object to download asset data 1028, a selectable object to refresh the asset search 1030, a selectable object to delete a selected asset 1032, a hosting category header 1034, a list of hosting categories 1036, a number of assets 1038 within each hosting category, a list of organizations 1040 containing filtered assets, a header 1042 for a number of filtered assets within each listed organization, a number of filtered assets within each listed organization 1044, a header 1046 for an organization and subsidiary asset summary, a selectable object to view more organization and asset summaries 1048, and a header listing internet service providers (ISPs) 1050.

Figure 11:
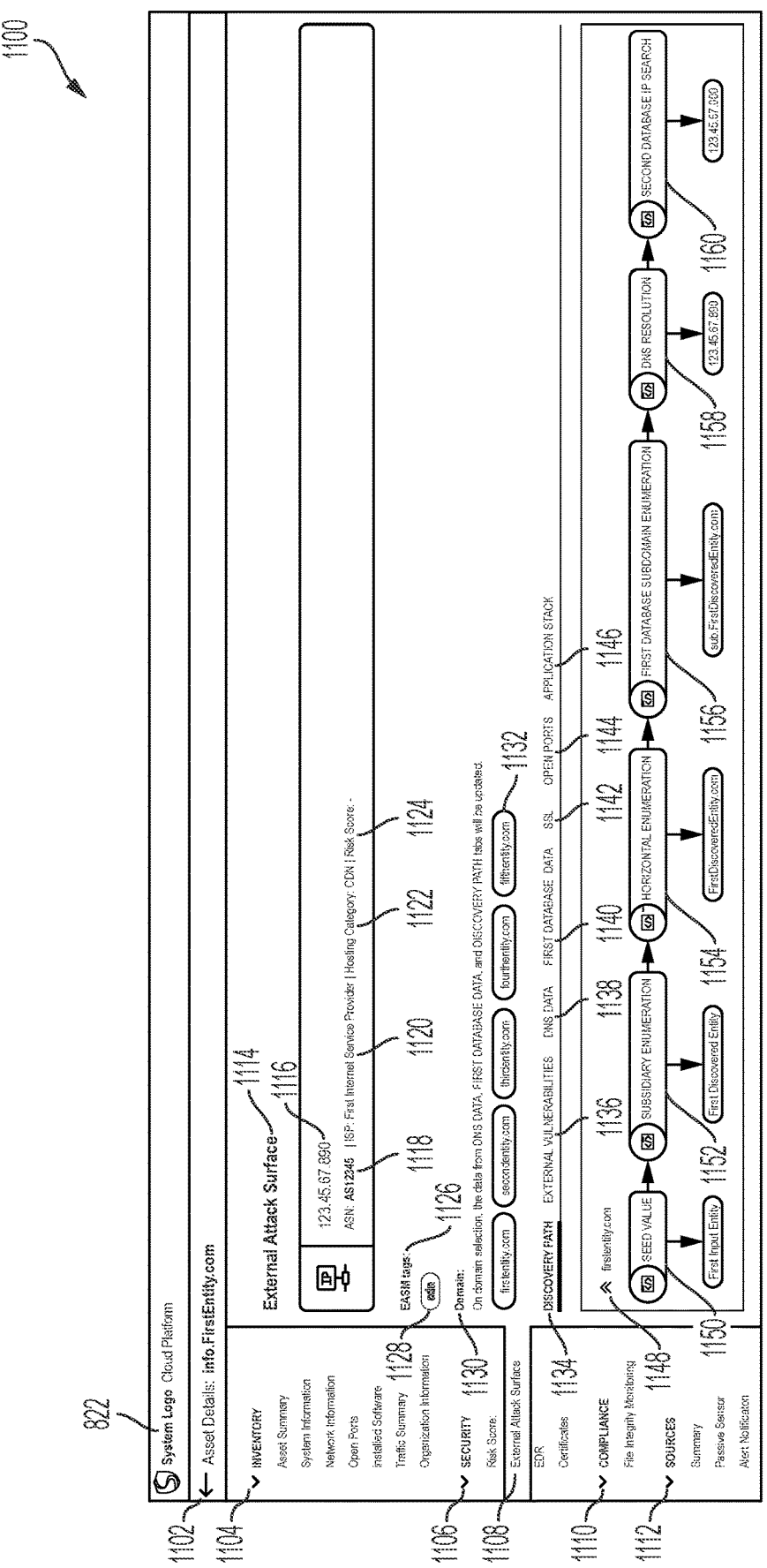
FIG. 11 shows a potential embodiment of a user interface associated with an external attack surface summary for a selected asset.

FIG. 11 shows a potential embodiment of an asset's external attack surface summary screen 1100. The asset's external attack surface summary screen 1100 may include a redirection link back to more generic asset details 1102, a header for redirecting links to other inventory display screens 1104, a header 1106 for redirecting links to other security-oriented display screens, including a redirection link 1108 for the external attack surface summary screen 1100, a compliance header 1110 for redirecting links to compliance display screens, a sources header 1112 for redirecting links to source display screens, an external attack surface header 1114, an IP address 1116 associated with the selected asset, an autonomous system number 1118 associated with the selected asset, an internet service provider 1120 associated with the selected asset, a hosting category 1122 associated with the selected asset, a risk score 1124 associated with the selected asset, an external attack surface management tag header 1126 with one or more external attack surface management icons 1128, a domain header 1130 with one or more associated domain icons 1132, a selectable heading for a discovery path sub-display screen 1134, a selectable heading for an external vulnerabilities sub-display screen 1136, a selectable heading for a domain name system data sub-display screen 1138, a selectable heading for a first database data sub-display screen 1140, a selectable heading for a secure socket layer sub-display screen 1142, a selectable heading for an open ports sub-display screen 1144, a selectable heading for an application stack sub-display screen 1146, an extendable discovery path header 1148, a discovery path icon showing the asset seed value 1150, a discovery path icon showing the asset subsidiary enumeration 1152, a discovery path icon showing the asset horizontal enumeration 1154, a discovery path icon showing the asset first database subdomain enumeration 1156, a discovery path icon showing the asset domain name system resolution 1158 and a discovery path icon showing the asset second database internet protocol search results 1160.

Figure 12A:
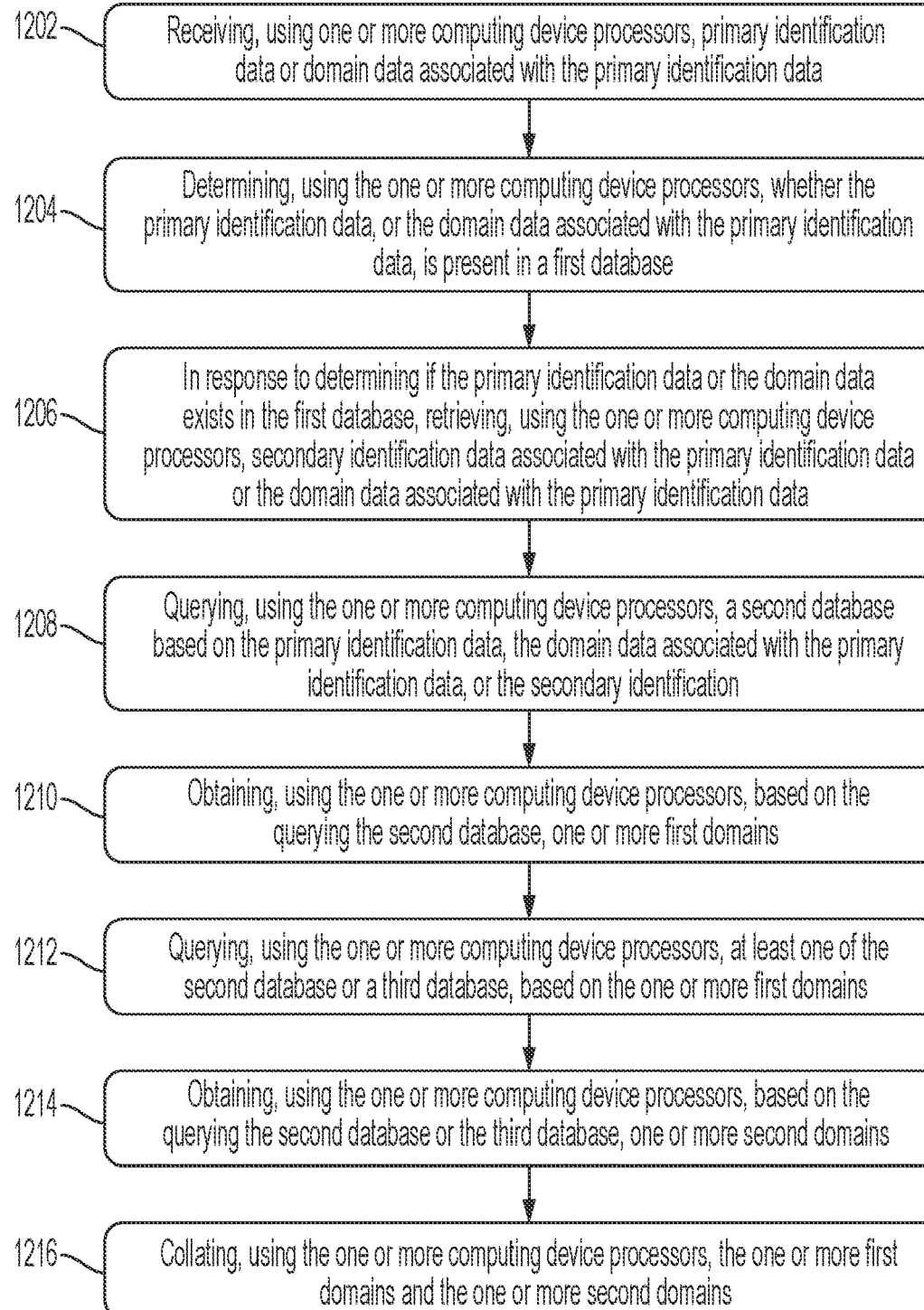
FIG. 12A and FIG. 12B show a potential flowchart associated with a method of discovering undisclosed assets of an organization using a catalog to detect system vulnerabilities and threats, wherein the catalog contains either self-generated or historic data.
Figure 12B:
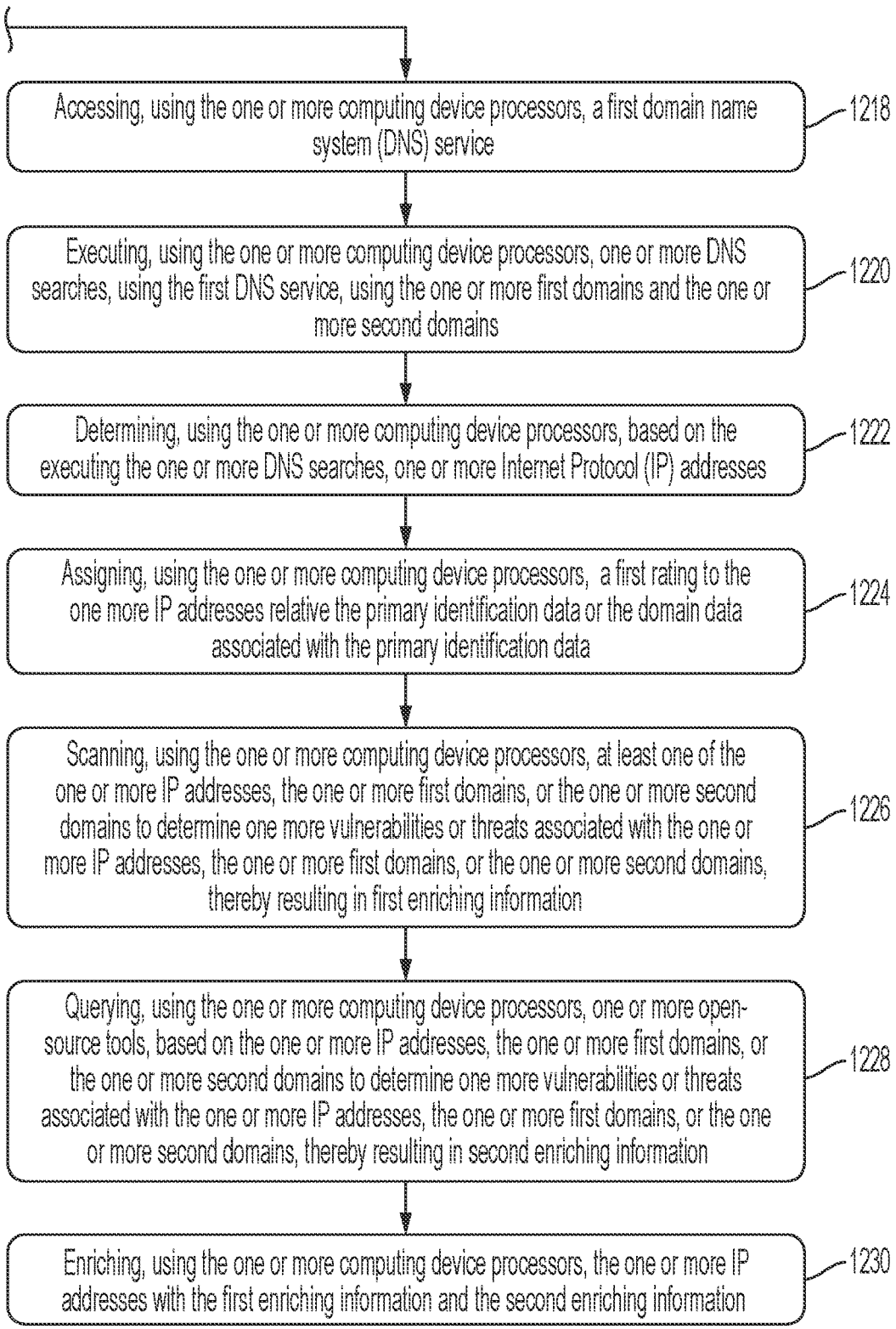

FIGS. 12A and 12B show an example flowchart for discovering one or more computing assets, such as one or more internet protocol addresses, associated with primary identification data, such as one or more organizations, to generate improved cybersecurity, with associated elements described in association with the steps of this flowchart and the discussion for at least FIGS. 1-3 and FIG. 7 among additional descriptions herein, according to some embodiments of this disclosure. The various processes executed in the flowchart shown in FIGS. 12A and 12B may be executed by one or more network, such as the external attack surface network discussed in association with one or more components of the system 100 shown in FIG. 1. Further, the various blocks in FIGS. 12A and 12B may be executed in a different order from that shown in FIGS. 12A and 12B. In FIG. 12A, at block 1202, the method comprises receiving, using one or more computing device processors, primary identification data or domain data associated with the primary identification data. In some embodiments, the primary identification data comprises one or more organizations. In some embodiments, the primary identification or the domain data is received from or configured by a user. In some embodiments, the receiving further comprises receiving one or more secure socket layer certificates, one or more border gateway protocol autonomous system numbers, or one or more internet protocol netblocks. In some embodiments, the primary identification data or the domain data associated with the primary identification data is comprised in seed data. In some embodiments, computing device processors may comprise one or more network systems 140a . . . 140n, data engines 118, processing units 202, units within a computing environment 204, or communication units 208. In some embodiments, computing system processors may comprise one or more network systems 140a . . . 140n, data engines 118, processing units 202, units within a computing environment 204, or communication units 208. At block 1204, the method comprises determining, using the one or more computing device processors, whether the primary identification data, or the domain data associated with the primary identification data, is present in a first database. In some embodiments, the first database may comprise a WHOIS database. At block 1206, the method comprises, in response to determining if the primary identification data or the domain data exists in the first database, retrieving, using the one or more computing device processors, secondary identification data associated with the primary identification data or the domain data associated with the primary identification data. In some embodiments, the secondary identification data comprises one or more subsidiary or acquired organizations. In some embodiments, the method further comprises, in response to determining the primary identification data or the domain data does not exist in the first database, generating, in substantially real-time, a catalog associated with the first identification data or the domain data associated with the first identification data. In some embodiments, the catalog comprises tertiary identification data associated with the primary identification data or the domain data associated with the primary identification data. In some embodiments, the catalog is used as a database containing historic data. At block 1208, the method comprises querying, using the one or more computing device processors, a second database based on the primary identification data, the domain data associated with the primary identification data, or the secondary identification. In some embodiments, the second database may comprise the database referenced within Shodan or a similar entity. At block 1210, the method comprises obtaining, using the one or more computing device processors, based on the querying the second database, one or more first domains. In some embodiments, the one or more first domains may comprise primary domains, subdomains, or both. In some embodiments, the obtaining comprises correlating the primary identification data with contact information. In some embodiments, the contact information may comprise one or more email addresses. At block 1212, the method comprises querying, using the one or more computing device processors, at least one of the second database or a third database, based on the one or more first domains. In some embodiments, the third database may comprise a database associated with a domain name system service provider or a search engine service provider. At block 1214, the method comprises obtaining, using the one or more computing device processors, based on the querying the second database or the third database, one or more second domains. In some embodiments, the one or more second domains may comprise primary domains, subdomains, or both. At block 1216, the method comprises collating, using the one or more computing device processors, the one or more first domains and the one or more second domains. In FIG. 12B, at block 1218, the method comprises accessing, using the one or more computing device processors, a first domain name system service. At block 1220, the method comprises executing, using the one or more computing device processors, one or more DNS searches, using the first DNS service, using the one or more first domains and the one or more second domains. At block 1222, the method comprises determining, using the one or more computing device processors, based on the executing the one or more DNS searches, one or more IP addresses. In some embodiments, the one or more IP addresses comprise or are comprised in one or more computing assets. In some embodiments, the one or more IP addresses are determined based on one or more geographical locations associated with at least one of the primary identification data, the domain data associated with the primary identification data, or the secondary identification data. In some embodiments, the one or more IP addresses may comprise one or more public IP addresses. At block 1224, the method comprises assigning, using the one or more computing device processors, a first rating to the one or more IP addresses relative the primary identification data or the domain data associated with the primary identification data. In some embodiments, the first rating comprises a confidence score. In some embodiments, the first rating comprises a high rating, a low rating, or a medium rating, wherein a high rating represents a better true positive, a medium rating represents a somewhat reliable true positive, and a low rating represents a questionable true positive. At block 1226, the method comprises scanning, using the one or more computing device processors, at least one of the one or more IP addresses, the one or more first domains, or the one or more second domains to determine one or more vulnerabilities or threats associated with the one or more IP addresses, the one or more first domains, or the one or more second domains, thereby resulting in first enriching information. In some embodiments, the scanning comprises native scanning. In some embodiments, the scanning further determines one or more SSL certificates, software lifecycle data, operating system data, open port-related data, service data, cloud hosting data, or cloud hosting category data. At block 1228, the method comprises querying, using the one or more computing device processors, one or more open-source tools, based on the one or more IP addresses, the one or more first domains, or the one or more second domains to determine one or more vulnerabilities or threats associated with the one or more IP addresses, the one or more first domains, or the one or more second domains, thereby resulting in second enriching information. In some embodiments, the querying further determines one or more SSL certificates, software lifecycle data, operating system data, open port-related data, service data, cloud hosting data, or cloud hosting category data. At block 1230, the method comprises enriching, using the one or more computing device processors, the one or more IP addresses with the first enriching information and the second enriching information.

Figure 13A:
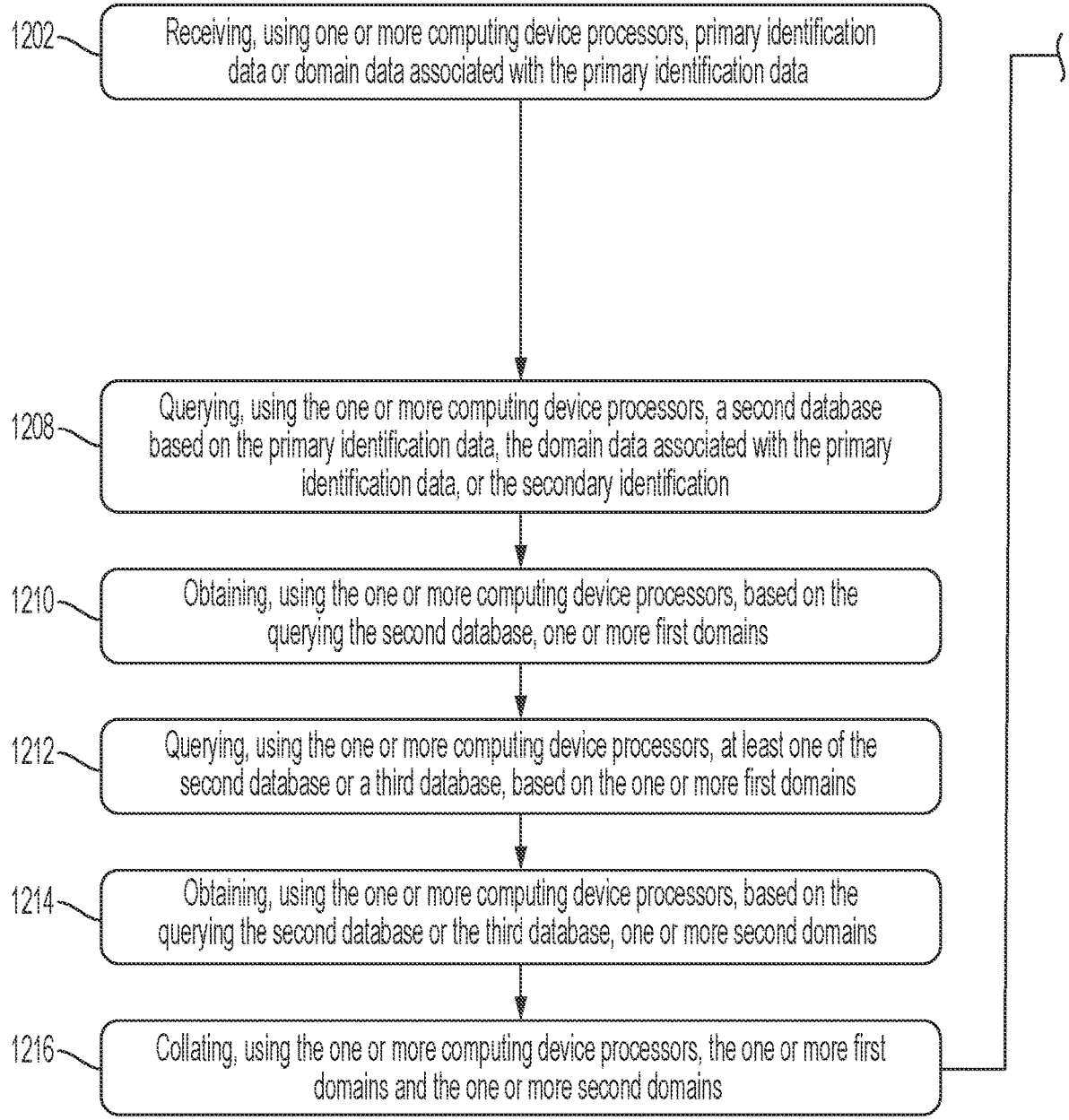
FIG. 13A and FIG. 13B show another potential flowchart associated with a method of discovering undisclosed assets of an organization to detect system vulnerabilities and threats.
Figure 13B:
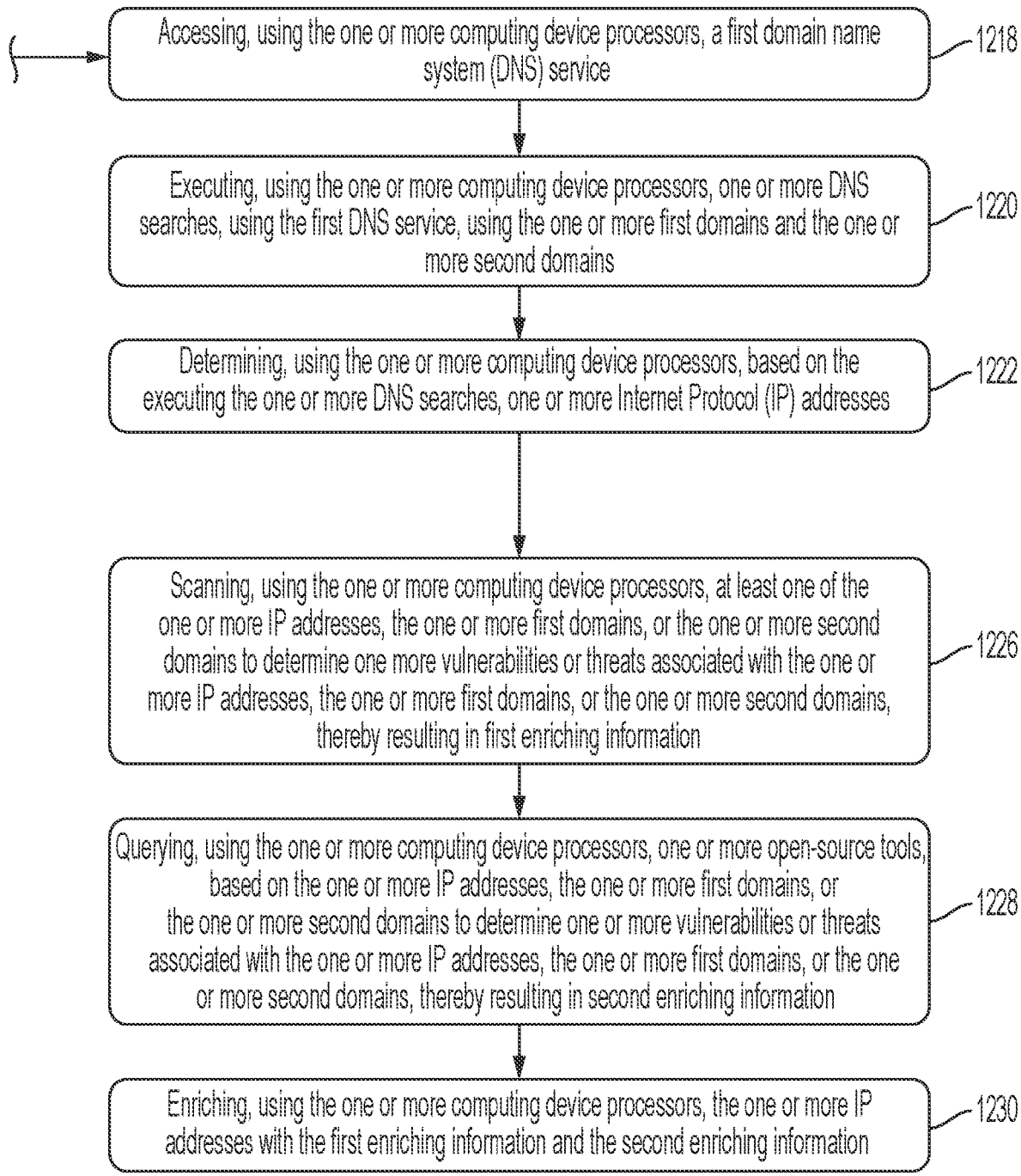

FIGS. 13A and 13B show a flowchart with an alternate embodiment for discovering one or more computing assets, such as one or more internet protocol addresses, associated with primary identification data, such as one or more organizations, to generate improved cybersecurity, with associated elements described in association with the steps of this flowchart and the discussion for at least FIGS. 1-3 and FIG. 7 among additional descriptions herein, according to some embodiments of this disclosure. The various processes executed in the flowchart shown in FIGS. 13A and 13B may be executed by one or more network, such as the external attack surface network discussed in association with one or more components of the system 100 shown in FIG. 1. Further, the various blocks in FIGS. 13A and 13B may be executed in a different order from that shown in FIGS. 13A and 13B. At blocks 1202, 1208, 1210, 1212, 1214, 1216, 1218, 1220, 1222, 1226, 1228, and 1230, the flowchart of FIGS. 13A and 13B are identical to flowchart in FIGS. 12A and 12B.

In some embodiments, the methods described may also be executed within a system. In some embodiments of the corresponding system, the first database and the third database are the same database. In some embodiments of the system, the one or more computing device processors, the first domain name system service, the first database, the second database, and the third database communicate via a cloud-based network. In some embodiments of the system, the one or more computing device processors, the first DNS service, the first database, the second database, and the third database communicate via a local network.

All potential embodiments of user interface described above may be accessed through devices other than an endpoint device 104, such as through a cloud-based device or through one or more network servers 138*a* . . . 138*n*. Although one user was often mentioned in the prior detailed descriptions, other embodiments comprise one or more users submitting information into the user interfaces. Any mention of a selectable object may comprise a clickable hyperlink, button, or icon to redirect a user to another digital location or choose an computing option. Any mention of a singular network system may comprise one or more network systems 138*a* . . . 138*n* or one or more cloud servers 102.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art. Any other variation of fabrication, use, or application should be considered apparent as an alternative embodiment of the present invention.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "if" may be construed to mean "when" or "upon" or "in response to determining" or "in response to detecting," depending on the context. Additionally, the term "and" may be construed to mean "or" and vice versa, depending on context.

Although the terms first, second, third, etc., may be used herein to describe various elements, components, regions, layers or sections, these elements, components, regions, layers or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. The embodiments were chosen and described in order to explain the principles of the disclosed subject-matter and its practical applications, to thereby enable others skilled in the art to use the technology disclosed and various embodiments with various modifications as are suited to the particular use contemplated. It is intended that the scope of the present disclosure be limited not by this detailed description, but rather by the claims of this application. As will be understood by those familiar with the art, the present disclosure may be embodied in other specific forms without departing from the spirit or essential characteristics thereof. It is appreciated that the term optimize/optimal and its variants (e.g., efficient or optimally) may simply indicate improving, rather than the ultimate form of 'perfection' or the like. Accordingly, the present disclosure is intended to be illustrative, but not limiting, of the scope of the present disclosure, which is set forth in the following claims.

What is claimed is:

1. A method for discovering one or more computing assets associated with primary identification data, the method comprising:
    receiving, using one or more computing device processors, primary identification data or domain data associated with the primary identification data;
    determining, using the one or more computing device processors, whether the primary identification data, or the domain data associated with the primary identification data, is present in a first database;
    in response to determining if the primary identification data or the domain data exists in the first database, retrieving, using the one or more computing device processors, secondary identification data associated with the primary identification data or the domain data associated with the primary identification data;
    querying, using the one or more computing device processors, a second database based on the primary identification data, the domain data associated with the primary identification data, or the secondary identification data;
    obtaining, using the one or more computing device processors, based on querying the second database, one or more first domains;
    querying, using the one or more computing device processors, at least one of the second database or a third database, based on the one or more first domains;
    obtaining, using the one or more computing device processors, based on querying the second database or the third database, one or more second domains;
    collating, using the one or more computing device processors, the one or more first domains and the one or more second domains;
    accessing, using the one or more computing device processors, a first domain name system (DNS) service;
    executing, using the one or more computing device processors, one or more DNS searches, using the first DNS service, using the one or more first domains and the one or more second domains;
    determining, using the one or more computing device processors, based on the executing the one or more DNS searches, one or more Internet Protocol (IP) addresses;
    assigning, using the one or more computing device processors, a first rating to the one or more IP addresses relative the primary identification data or the domain data associated with the primary identification data;
    scanning, using the one or more computing device processors, at least one of the one or more IP addresses, the one or more first domains, or the one or more second domains to determine one or more vulnerabilities or threats associated with the one or more IP addresses, the one or more first domains, or the one or more second domains, thereby resulting in first enriching information;
    querying, using the one or more computing device processors, one or more open-source tools, based on the one or more IP addresses, the one or more first domains, or the one or more second domains to determine the one or more vulnerabilities or threats associated with the one or more IP addresses, the one or more first domains, or the one or more second domains, thereby resulting in second enriching information; and enriching, using the one or more computing device processors, the one or more IP addresses with the first enriching information and the second enriching information.

2. The method of claim 1, wherein the primary identification data or the domain data is received from or configured by a user.

3. The method of claim 2, wherein the receiving further comprises receiving one or more secure socket layer (SSL) certificates, border gateway protocol (BGP) autonomous system numbers (ASNs), or IP Netblocks.

4. The method of claim 1, further comprising in response to determining the primary identification data or the domain data does not exist in the first database, generating, in substantially real-time, a catalog associated with a first identification data or the domain data associated with the first identification data.

5. The method of claim 4, wherein the catalog comprises tertiary identification data associated with the primary identification data or the domain data associated with the primary identification data.

6. The method of claim 1, wherein the obtaining, using the one or more computing device processors, based on querying the second database, of the one or more first domains, comprises correlating the primary identification data with contact information.

7. The method of claim 1, wherein the one or more IP addresses are determined based on one or more geographical locations associated with at least one of the primary identification data, the domain data associated with the primary identification data, or the secondary identification data.

8. The method of claim 1, wherein the first rating comprises a high rating, a low rating, or a medium rating.

9. The method of claim 1, wherein the scanning, using the one or more computing device processors, at least one of the one or more IP addresses, the one or more first domains, or the one or more second domains to determine the one or more vulnerabilities or threats associated with the one or more IP addresses, further determines one or more SSL certificates, software lifecycle data, operating system data, open port-related data, service data, cloud hosting data, or cloud hosting category data.

10. The method of claim 1, wherein the querying using the one or more computing device processors, the one or more open-source tools, based on the one or more IP addresses, the one or more first domains, or the one or more second domains to determine the one or more vulnerabilities or threats associated with the one or more IP addresses, the one or more first domains, or the one or more second domains, further determines one or more secure socket layer (SSL) certificates, software lifecycle data, operating system data, open port-related data, service data, cloud hosting data, or cloud hosting category data.

11. The method of claim 1, wherein the primary identification data comprises one or more organizations.

12. The method of claim 1, wherein the primary identification data or the domain data associated with the primary identification data is comprised in seed data.

13. The method of claim 1, the secondary identification data comprises one or more subsidiary or acquired organizations.

14. The method of claim 1, wherein the one or more IP addresses comprise or are comprised in the one or more computing assets.

15. The method of claim 1, wherein the first rating comprises a confidence score.

16. A system used to discover one or more computing assets associated with primary identification data, the system comprising:

one or more computing system processors; and memory storing instructions that, when executed by the one or more computing system processors, cause the system to:

receive, primary identification data or domain data associated with the primary identification data;

determine, whether the primary identification data, or the domain data associated with the primary identification data, is present in a first database;

in response to determining if the primary identification data or the domain data exists in the first database, retrieve, secondary identification data associated with the primary identification data or the domain data associated with the primary identification data;

query, a second database based on the primary identification data, the domain data associated with the primary identification data, or the secondary identification data;

obtain, based on querying the second database, one or more first domains;

query, at least one of the second database or a third database, based on the one or more first domains;

obtain, based on querying the second database or the third database, one or more second domains;

collate, the one or more first domains and the one or more second domains;

access, a first domain name system (DNS) service;

execute, one or more DNS searches, using the first DNS service, using the one or more first domains and the one or more second domains;

determine, based on the executing the one or more DNS searches, one or more Internet Protocol (IP) addresses;

assign, a first rating to the one or more IP addresses relative to the primary identification data or the domain data associated with the primary identification data;

scan, at least one of the one or more IP addresses, the one or more first domains, or the one or more second domains to determine one or more vulnerabilities or threats associated with the one or more IP addresses, the one or more first domains, or the one or more second domains, thereby resulting in first enriching information;

query, one or more open-source tools, based on the one or more IP addresses, the one or more first domains, or the one or more second domains to determine the one or more vulnerabilities or threats associated with the one or more IP addresses, the one or more first domains, or the one or more second domains, thereby resulting in second enriching information; and enrich, the one or more IP addresses with the first enriching information and the second enriching information.

17. The system of claim 16, wherein the first database and the third database are the same database.

18. The system of claim 16, wherein the one or more computing system processors, the first DNS service, the first database, the second database, and the third database communicate via a cloud-based network.

19. The system of claim 16, wherein the one or more computing system processors, the first DNS service, the first database, the second database, and the third database communicate via a local network.

20. A method for discovering one or more computing assets associated with primary identification data, the method comprising:

receiving, using one or more computing device processors, primary identification data or domain data associated with the primary identification data;

querying, using the one or more computing device processors, a first database based on the primary identification data, the domain data associated with the primary identification data;

obtaining, using the one or more computing device processors, based on querying the first database, one or more first domains;

querying, using the one or more computing device processors, at least one of the first database or a second database, based on the one or more first domains;

obtaining, using the one or more computing device processors, based on querying the first database or the second database, one or more second domains;

collating, using the one or more computing device processors, the one or more first domains and the one or more second domains;

accessing, using the one or more computing device processors, a first domain name system (DNS) service;

executing, using the one or more computing device processors, one or more DNS searches, using the first DNS service, using the one or more first domains and the one or more second domains;

determining, using the one or more computing device processors, based on the executing the one or more DNS searches, one or more Internet Protocol (IP) addresses;

scanning, using the one or more computing device processors, at least one of the one or more IP addresses, the one or more first domains, or the one or more second domains to determine one or more vulnerabilities or threats associated with the one or more IP addresses, the one or more first domains, or the one or more second domains, thereby resulting in first enriching information;

querying, using the one or more computing device processors, one or more open-source tools, based on the one or more IP addresses, the one or more first domains, or the one or more second domains to determine the one or more vulnerabilities or threats associated with the one or more IP addresses, the one or more first domains, or the one or more second domains, thereby resulting in second enriching information; and enriching, using the one or more computing device processors, the one or more IP addresses with the first enriching information and the second enriching information.

* * * * *